US011491471B2

(12) United States Patent
Lu et al.

(10) Patent No.: US 11,491,471 B2
(45) Date of Patent: Nov. 8, 2022

(54) METHOD OF PREPARING WIDE-TEMPERATURE CATALYST FOR PREFERENTIAL OXIDATION OF CARBON MONOXIDE IN HYDROGEN-ENRICHED ATMOSPHERE, AND PRODUCT AND USE LTHEREOF

(71) Applicant: University of Science and Technology of China, Anhui (CN)

(72) Inventors: Junling Lu, Anhui (CN); Lina Cao, Anhui (CN); Qi Yao, Anhui (CN); Si Chen, Anhui (CN); Huan Yan, Anhui (CN); Shiqiang Wei, Anhui (CN); Jinlong Yang, Anhui (CN)

(73) Assignee: University of Science and Technology of China, Anhui (CN)

( * ) Notice: Subject to any disclaimer, the term of this patent is extended or adjusted under 35 U.S.C. 154(b) by 90 days.

(21) Appl. No.: 16/089,012

(22) PCT Filed: Apr. 27, 2016

(86) PCT No.: PCT/CN2016/080364
§ 371 (c)(1),
(2) Date: Sep. 27, 2018

(87) PCT Pub. No.: WO2017/185260
PCT Pub. Date: Nov. 2, 2017

(65) Prior Publication Data
US 2019/0105638 A1 Apr. 11, 2019

(51) Int. Cl.
*B01J 23/89* (2006.01)
*B01J 23/38* (2006.01)
*B01J 37/02* (2006.01)
*B01J 21/18* (2006.01)
*B01J 21/06* (2006.01)
*B01J 21/10* (2006.01)
*B01J 23/74* (2006.01)
*B01J 23/10* (2006.01)
*B01J 21/00* (2006.01)
*B01J 37/00* (2006.01)
*B01J 21/04* (2006.01)
*B01J 21/08* (2006.01)
(Continued)

(52) U.S. Cl.
CPC ............ *B01J 23/892* (2013.01); *B01J 21/00* (2013.01); *B01J 21/04* (2013.01); *B01J 21/063* (2013.01); *B01J 21/066* (2013.01); *B01J 21/08* (2013.01); *B01J 21/10* (2013.01); *B01J 21/18* (2013.01); *B01J 21/185* (2013.01); *B01J 23/10* (2013.01); *B01J 23/38* (2013.01); *B01J 23/74* (2013.01); *B01J 23/8906* (2013.01); *B01J 23/8913* (2013.01); *B01J 37/00* (2013.01); *B01J 37/024* (2013.01); *B01J 37/0217* (2013.01); *B01J 37/0221* (2013.01); *B01J 37/0228* (2013.01); *B01J 37/0238* (2013.01); *B01J 37/0248* (2013.01); *C01B 3/583* (2013.01); *C01B 2203/044* (2013.01); *C01B 2203/047* (2013.01); *H01M 8/0668* (2013.01)

(58) Field of Classification Search
None
See application file for complete search history.

(56) References Cited

U.S. PATENT DOCUMENTS 5,017,357 A * 5/1991 Kolts ................... B01D 53/864
423/213.5
5,096,866 A * 3/1992 Itoh ...................... B01J 23/8926
502/101
(Continued)

FOREIGN PATENT DOCUMENTS

| CA | 2766021 | * | 1/2011 |
| CN | 103861591 A | | 6/2014 |

(Continued)

OTHER PUBLICATIONS

Jain, et al. "Controlled Modification of Pt/Al2O3 . . . ".Applied Catalysis B. En 89, 349-355 (2009). (Year: 2009).*

(Continued)

*Primary Examiner* — Sheng H Davis
(74) *Attorney, Agent, or Firm* — Cesari & McKenna, LLP

(57) ABSTRACT

This invention provides a preparation method of a catalyst for preferential oxidization of CO in a hydrogen-enriched atmosphere, and a catalyst product obtained from the method and its applications thereof. Particularly, in this invention, a wide-temperature catalyst for preferential oxidization of CO in a hydrogen-enriched atmosphere is obtained by depositing one or more of an iron oxide, cobalt oxide, and nickel oxide as a promoter onto the surface of a supported Pt-group noble metal catalyst precursor via chemical vapor deposition or atomic layer deposition. In the wide-temperature catalyst, the active noble metal component has a content of 0.1 to 10 wt %, and the promoter has a content of 0.1 to 10 wt % in terms of the metal element thereof. In the reaction of preferential oxidation of CO in a hydrogen-enriched atmosphere, the catalyst prepared by this invention can exhibit excellent catalytic performance and can achieve high conversion of CO with high selectivity in a wide temperature range of −80 to 200° C., for example. Also, the catalyst can remain stable for a long time even in a case where steam and $CO_2$ are present in the hydrogen-enriched atmosphere.

11 Claims, 7 Drawing Sheets

(51) Int. Cl.
*C01B 3/58* (2006.01)
*H01M 8/0668* (2016.01)

(56) References Cited

U.S. PATENT DOCUMENTS

| | | | |
|---|---|---|---|
| 7,029,640 B2* | 4/2006 | Yao | B01D 53/864 |
| | | | 423/247 |
| 9,878,309 B2* | 1/2018 | Conradsen | B01J 35/0006 |
| 2003/0012700 A1* | 1/2003 | Carnahan | G01N 31/10 |
| | | | 422/400 |
| 2015/0137414 A1* | 5/2015 | Shanov | B01J 37/16 |
| | | | 264/176.1 |
| 2016/0079607 A1* | 3/2016 | Kaneko | H01M 4/8657 |
| | | | 429/465 |

FOREIGN PATENT DOCUMENTS

| | | |
|---|---|---|
| CN | 105032385 A | 11/2015 |
| JP | 2010137131 A | 6/2010 |
| WO | WO-2005061080 A1 | 7/2005 |

OTHER PUBLICATIONS

Song, et al. "Substrate Dependent . . . ".Chem Mater, 24, 4675-4685 (2012). (Year: 2012).*

Bachmann, et al. "Stoichiometry of Nickel Oxide Films Prepared by ALD". Chem. Vap. Deposition. 17, 177-180 (2011). (Year: 2011).*

Sun, et al. "Monolayer iron oxide film on Pt promotes low temperature CO oxidation". Journal of Catalysis. 266, 359-368 (2009). (Year: 2009).*

Rooth, Marten, et al. "Atomic Layer deposition of iron oxide thin films and Nanotubes .". Chem. Vap. Deposition. 14, 67-70 (2008) (Year: 2008).*

Yang et al. "Electron Exchange . . . " J. Phys. Chem. 84, 3094-3099 (1980) (Year: 1980).*

Wu, Yun-Chung, et al. "Control of microstructure in (001)-orientated FePt-SiO2 granular films". Journal of Applied Physics 103 (2008). (Year: 2008).*

Sun, Y-N. et al. "Monolayer iron oxide film . . . ". Journal of Catalysis. 266. 359-368 (2009) (Year: 2009).*

Jain et al; "Controlled modification of Pt/Al2O3 for the preferential oxidation of CO in hydrogen: A comparative study of modifying element". Applied Catalysis B: Environmental; Jul. 15, 2009, vol. 89, No. 34, pp. 350 and 352.

Wang et al; "Enhanced Catalytic Hydrogenation Activity and Selectivity of Pt-MxOy/Al2O3 (M = Ni, Fe, Co) Heteroaggregate Catalysts by in Situ Transformation of PtM Alloy Nanoparticles". The Journal of Physical Chemistry; Apr. 11, 2013, vol. 117, No. 14, pp. 7294-7302.

Extended Search Report dated Sep. 2, 2019 in Corresponding European Patent Application No. 16899773.2.

* cited by examiner

METHOD OF PREPARING WIDE-TEMPERATURE CATALYST FOR PREFERENTIAL OXIDATION OF CARBON MONOXIDE IN HYDROGEN-ENRICHED ATMOSPHERE, AND PRODUCT AND USE LTHEREOF

CROSS-REFERENCE TO RELATED APPLICATIONS

This application is the National Stage of International Application No. PCT/CN2016/080364, filed Apr. 27, 2016. The content of this application is hereby incorporated by reference in its entirety.

TECHNICAL FIELD

This invention relates to a metal catalyst for preferential oxidization of carbon monoxide (CO) in a hydrogen-enriched atmosphere, and the preparation method and use thereof.

BACKGROUND ART

In recent years, clean energy sources are of increasing attraction. Among them, fuel cells are environment-friendly power generation apparatuses. Proton exchange membrane fuel cells (PEMFC) are the highly desirable ones. Due to its small volume, light weight, zero emission, high energy conversion density, and etc., PEMFCs have wide applications in fields of future static apparatuses, hydrogen fuel cell automobiles, military equipment, aerospace, and so on. Currently, hydrogen is mainly produced from steam reforming of methanol and hydrocarbons such as natural gas and etc., and the water-gas shift reaction. These hydrogen sources typically contain approximately 0.5% to 2% of trace CO, which can adsorb on the surface of Pt electrode of PEMFCs and poison the electrode severely, thus degrading the performance. Therefore, a hydrogen source must first be subjected to a CO purification treatment to control the content of CO at 10 ppm or below before entering a fuel cell. In order to solve this problem, many methods have been attempted by researchers. At present, the methods for removing CO in hydrogen sources used in fuel cells mainly include adsorption, Pd membrane separation, CO methanation, and CO selective oxidation. Among them, CO selective oxidation has been found to be the most desirable method for removing trace CO from these hydrogen sources.

At present, catalysts for preferential oxidation (represented by PROX hereinafter) of CO in a hydrogen-enriched atmosphere are mainly divided into several types below.

(a) Gold-based catalysts: Much attention has been paid to supported Au catalysts due to its high CO oxidation activity at low temperatures. However, it has been found that the selectivity of CO oxidation decreases rapidly as increasing the reaction temperature due to the competition reaction of $H_2$ oxidation, which makes it difficult to decrease the concentration of CO to 10 ppm or less. For example, as mentioned in the Chinese Patent Application CN102441401A, Au nanoparticles were supported on a copper-titanium mixed oxide carrier, with an Au content of 0.5 to 5 wt %, the temperature range for 100% CO conversion was merely 30 to 60° C., the limitation of such narrow operating temperature is relatively large. Additionally, such Au catalyst also has a relatively poor stability and its activity has very strict requirements for the preparation methods and processes, so that the use of supported Au catalyst in PROX reaction is greatly limited.

(b) Copper-based non-noble metal catalysts: Compared to other types of catalyst, copper-based catalysts have a relatively low cost. However, they are typically not active until the reaction temperature reaches 100° C. or above in the PROX reaction. They also show a poor stability in the presence of $CO_2$ and water vapor. An example is a $CeO_2$-supported CuO catalyst mentioned in the Chinese Patent Application CN102407123A.

(c) Platinum-group noble metal catalysts: At present, Pt-group metal (Pt, Ru, Rh, Pd, and Ir) catalysts alone without any promoters have also very low activity at 100° C. or less (J. Phys. Chem. B 2005, 109, 23430-23443). The improvement of catalytic activity is often achieved by using bimetallic alloy or the addition of promoters. For example, Nippon Oil Corporation proposed a catalyst using Pt—Ru alloy as the active component (see CN101507924A). Additionally, Chinese Patent Application CN 101856621 reported promoted catalysts wherein a platinum-group metal is used as an active metal and a transition metal such as Fe, Co, Ni, and etc. as a promoter through the equal-volume impregnation method. With these catalysts, they can completely remove CO in hydrogen in a temperature range of 60 to 100° C. Chinese Patent Application CN101428227A also proposed an iridium-based two-component catalyst prepared by a stepwise or co-impregnation method, wherein the promoter is Fe, Sn, Mn, Co, Ni, Cr, and/or Zn. This catalyst showed complete CO conversion in a temperature range of 60 to 100° C. The research team of Watanabe in Japan prepared Pt—Fe/Zeolite alloy catalysts on a Mordenite zeolite with different Pt:Fe mass ratios using an ion exchange method. They showed that this catalyst can achieve complete CO conversion in a temperature range of 85 to 150° C. (Appl. Catal. B: Environ. 2003, 46, 595-600). The research team of Xinhe Bao at Dalian Institute of Chemical Physics, Chinese Academy of Sciences also synthesized two-component Pt—Fe/$SiO_2$ and Pt—Fe/carbon black catalyst samples by using a successive impregnation method and a co-impregnation method, respectively. However, these catalysts may only achieve complete CO conversion in hydrogen in a narrow temperature range of 25 to 50° C. (Science, 2005 328, 1141-1144, Energy Environ. Sci., 2012, 5, 6313-6320). In their work, they suggested an oxide is the promoter, and the active sites is the Pt-oxide promoter interface for CO oxidation (Science, 2005 328, 1141-1144, Acc. Chem. Res., 2013, 46, 1692-1701). Meanwhile, Professor Nanfeng Zheng at Xiamen University proposed that Pt—$Fe(OH)_3$ interface is the active sites for CO oxidation on the Pt—Fe catalyst system. However, in these previous studies, the addition of the oxide promoter was achieved by the conventional liquid-phase methods such as impregnation, precipitation, and etc., these methods are very difficult to optimize the metal-oxide interface, thus effectively improving the catalyst performance. Consequently, the operating temperature range for achieving complete CO conversion in the PROX reaction is still very narrow, hardly meeting requirements for their practical applications.

Additionally, since the atomic layer deposition technique was invented (U.S. Pat. No. 4,058,430 (1977)), catalyst synthesis using atomic layer deposition by taking advantage of the precise control has attracted great attention (Surf. Sci. Rep., (2016) doi:10.1016/j.surfrep.2016.03.003; Acc. Chem. Res., 2013, 46, 1806-1815; ACS Catal. 2015, 5, 1804-1825). Among them, there have been several related studies reported with respect to oxide overcoating of a metal catalyst using the atomic layer deposition technique to tailor the catalyst performance For example, a sintering- and coking-resistant Pd catalyst in partial oxidative dehydrogenation reaction of ethane at a high temperature was achieved by depositing an $Al_2O_3$ coating layer on the surface of a $Pd/Al_2O_3$ catalyst using an atomic layer deposition technique (Science, 2012, 335, 1205-1208; PCT/US2012/039343); depositing an $Al_2O_3$ coating layer on the surface of a $Cu/\gamma-Al_2O_3$ catalyst using the atomic layer deposition allowed to prevent the leaching of the Cu active component in liquid-phase catalytic reactions (Angew. Chem. 2013, 125, 14053-14057); depositing a $TiO_2$ coating layer on the surface of a Co/C catalyst using the atomic layer deposition remarkably improved the activity of a Co/C catalyst in the electrocatalytic reaction (ACS Catal. 2015, 5, 3463-3469); depositing an $ZrO_2$ coating layer on the surface of a $Pd/Al_2O_3$ catalyst using the atomic layer deposition improved the catalyst stability and activity significantly in the complete combustion reaction of methane (ACS Catal. 2015, 5, 5696-5701). In brief, the above work related to oxide overcoating of a metal catalyst by using the atomic layer deposition technique has mainly focused on the inhibition of the sintering of metal particles during catalytic reactions. Therein, the oxide coating layers behave as a physical barrier layer, and the oxide coating layers deposited were relatively thick (greater than 1 nm) so that to achieve a sufficient improvement of metal stability. Metal particles coated by an oxide layer participate in the catalytic reaction through the micropores formed in the oxide layer. However, with respect to deposition of a high-dispersion of oxide species, or even a metal single atom oxide ($M_1O_x$, wherein M is a metal atom) species on a metal particle and thereby achieving a maximal optimization of a metal-oxide interface has not been reported so far. Furthermore, with respect to the use of a catalyst, which is prepared by using a technique of chemical vapor deposition or atomic layer deposition, in the PROX reaction has not been reported either so far.

SUMMARY OF THE INVENTION

In order to overcome one or more of the drawbacks in the prior art, an object of this invention is to provide a wide-temperature catalyst for preferentially oxidizing CO in a hydrogen-enriched atmosphere, which may be used in a wide temperature range (for example, may be used in a temperature range of −80 to 200° C.) and can exhibit excellent catalytic activity, selectivity, and stability in the reaction of preferential oxidation of CO in a hydrogen-enriched atmosphere.

Thus, in one aspect, this invention provides a method of preparing a wide-temperature catalyst for preferentially oxidizing CO in a hydrogen-enriched atmosphere, the catalyst comprises a carrier, an active component, and a promoter, wherein the carrier is one or more selected from $SiO_2$, $Al_2O_3$, $TiO_2$, MgO, $CeO_2$, $ZrO_2$, activated carbon, carbon black, graphene, and carbon nanotubes; the active component is one or more selected from Pt, Ir, Ru, Rh, and Pd with a content of 0.1 to 10 wt % in the wide-temperature catalyst; and the promoter is one or more selected from iron oxide, cobalt oxide, and nickel oxide, with a content of 0.01 to 15 wt % in the wide-temperature catalyst, in terms of the metal element thereof, the method comprises:
providing a supported catalyst precursor comprising the active component and the carrier; and depositing the promoter onto the surface of the supported catalyst precursor using a method of chemical vapor deposition or atomic layer deposition to obtain the wide-temperature catalyst.

Preferably, the promoter deposition comprises the steps of:

(a) placing the supported catalyst precursor in a reactor at 20 to 500° C., and introducing the vapor of an iron precursor, a cobalt precursor, and/or a nickel precursor as a promoter precursor to adsorb onto the surface of the supported catalyst precursor;

(b) introducing an oxidizing or reducing agent so as to convert the promoter precursor adsorbed on the surface of the supported catalyst precursor to the promoter; and (c) optionally, repeating the above steps (a) and (b) one or more times sequentially or simultaneously to regulate the mass content of the promoter.

Preferably, the iron precursor is one or more selected from ferrocene, vinyl ferrocene, ethyl ferrocene, amino ferrocene, dimethylamino ferrocene, iron acetylacetonate ($Fe(acac)_3$), bis(2,4-dimethylpentadienyl) iron, (2,2,6,6-tetramethyl-3,5-pentanedionato) iron(III), bis(N,N'-di-t-butylacetamidinyl) iron, iron carbonyl, and iron t-butoxide. Most preferably, the iron precursor is ferrocene.

The cobalt precursor is one or more selected from cobaltocene, cobalt acetylacetonate, bis(N,N'-diisopropylacetamidinyl) cobalt, dicarbonylcyclopentadienyl cobalt, t-butyltricarbonyl cobalt, (2,2,6,6-tetramethyl-3,5-pentanedionato) cobalt, and cobalt 2-methoxyethoxide. Most preferably, the cobalt precursor is cobaltocene.

The nickel precursor is one or more selected from nickelocene, nickel acetylacetonate, bis(N,N'-diisopropylacetamidinyl) nickel, (2,2,6,6-tetramethyl-3,5-pentanedionato) nickel(II), dibutyldithiocarbamate nickel(II), and nickel 2-methoxyethoxide.

Preferably, the oxidizing agent is one or more selected from $O_2$, $O_3$, $H_2O$, $H_2O_2$, NO, and $NO_2$. More preferably, the oxidizing agent is selected from $O_2$, $O_3$, $H_2O$, and $H_2O_2$; the reducing agent is one or more selected from $H_2$, $NH_3$, and $N_2H_4$. More preferably, the reducing agent is $H_2$.

Preferably, the method further comprises the step of purging the reactor with an inert gas between the step (a) and the step (b) and after the step (b).

Preferably, the steps (a) and (b) are sequentially repeated 1 to 10 times.

Preferably, the supported catalyst precursor is commercially available, or synthesized by impregnating a desired amount of a soluble salt of an active component onto a carrier via an impregnation method, followed by drying and calcination.

In another aspect, the present invention provides a wide-temperature catalyst for preferentially oxidizing CO in a hydrogen-enriched atmosphere, the catalyst comprises a carrier, an active component, and a promoter, wherein the carrier is one or more selected from $SiO_2$, $Al_2O_3$, $TiO_2$, MgO, $CeO_2$, $ZrO_2$, activated carbon, carbon black, graphene, and carbon nanotubes;

the active component is one or more selected from Pt, Ir, Ru, Rh, and Pd with a content of 0.1 to 10 wt % in the wide-temperature catalyst; and the promoter is one or more selected from iron oxide, cobalt oxide, and nickel oxide with a content of 0.01 to 15 wt % in the wide-temperature catalyst, in terms of the metal element thereof, and wherein the wide-temperature catalyst is obtained by depositing a promoter onto the surface of a supported catalyst precursor comprising the active component and the carrier via chemical vapor deposition or atomic layer deposition method, and the wide-temperature catalyst is capable of achieving preferential oxidation of CO in a hydrogen-enriched atmosphere.

Preferably, the active component is selected from Pt. Preferably, the promoter is selected from iron oxide. Preferably, the carrier is selected from $SiO_2$, and the wide-temperature catalyst is capable of achieving preferential oxidation of CO in a hydrogen-enriched atmosphere in a wide temperature range of −80 to 200° C.

In another aspect, the present invention provides a use of the wide-temperature catalyst prepared by the method described above or the wide-temperature catalyst described above for preferential oxidization of CO in a hydrogen-enriched atmosphere.

Preferably, the wide-temperature catalyst is subjected to a pretreatment before use, wherein the pretreatment is oxidization or calcination with oxygen at a temperature of 100 to 600° C. for 0.5 to 5 hours, and then reduction with hydrogen for 0.5 to 5 hours.

Preferably, the wide-temperature catalyst is subjected to a pretreatment before use, wherein the pretreatment is oxidization or calcination with oxygen at a temperature of 150 to 300° C. for 0.5 to 2 hours, and then reduction with hydrogen for 0.5 to 2 hours.

Preferably, a volume ratio of CO to $O_2$ in the hydrogen-enriched atmosphere is 1:0.5 to 1:2.

Preferably, a volume ratio of CO to $O_2$ in the hydrogen-enriched atmosphere is 1:0.5 to 1:1.

In this invention, optimization of the interface between a noble metal active component and an oxide promoter is achieved by depositing a metal oxide promoter onto the surface of a Pt-group noble metal (Pt, Ir, Ru, Rh, or Pd) supported catalyst precursor via a chemical vapor deposition method or an atomic layer deposition method. In preferential oxidation of CO in a hydrogen-enriched atmosphere, the noble metal catalyst obtained by such a method can exhibit excellent catalytic performance and can achieve oxidation of CO in a hydrogen-enriched atmosphere with high selectivity and high CO conversion in a significantly wider temperature range (for example, possibly in a wide temperature range of −80 to 200° C.) compared to the existing catalysts. Furthermore, the catalyst can remain stable for a long time in the presence of steam and $CO_2$.

DESCRIPTION OF EMBODIMENTS

Figure 1:
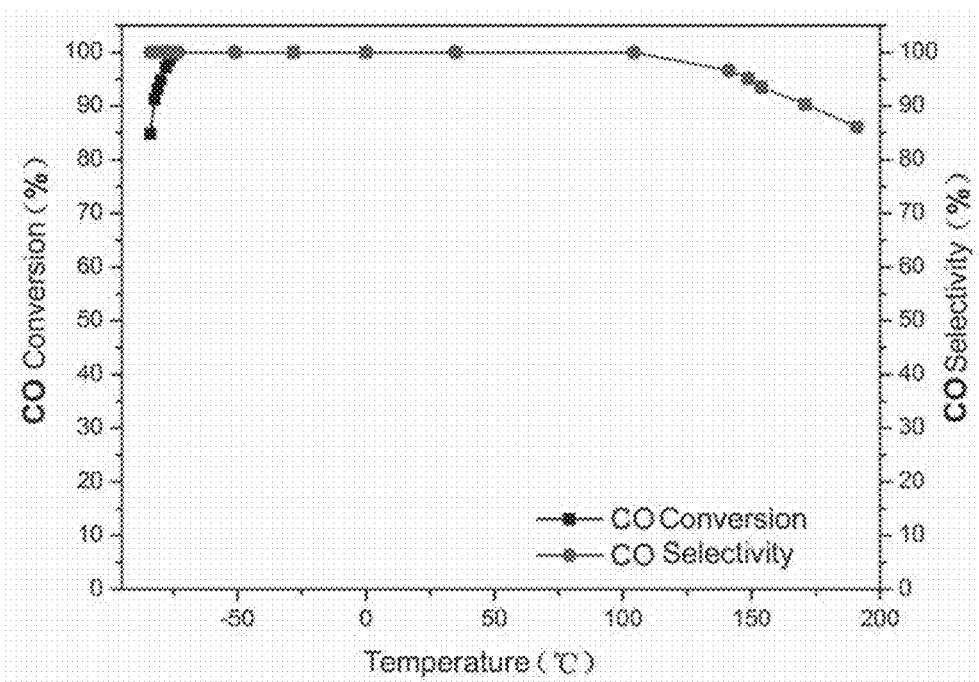
FIG. 1 shows a plot of CO conversion and CO selectivity in preferential oxidation of CO in a hydrogen-enriched atmosphere over a Pt-1cFeO$_x$/SiO$_2$ wide-temperature catalyst prepared according to Example 1 of this invention, wherein the volume ratio of CO:O$_2$:H$_2$ is 1:0.5:48 for the hydrogen-enriched reaction gas sample used therein.

In order to achieve the objects described above, the inventors of this invention through intensive investigations unexpectedly found that precise deposition of an oxide promoter with a high dispersion can be achieved on the surface of a Pt-group noble metal (Pt, Ir, Ru, Rh, or Pd) supported catalyst precursor by using a method of chemical vapor deposition or atomic layer deposition; and optimization of the interface between a noble metal active component and an oxide promoter can be achieved by taking advantage of precise control of chemical vapor deposition, particularly the atomic layer deposition technique. Therefore, the catalyst activity and the noble metal utilization are greatly improved, and a wide-temperature catalyst is obtained, which can achieve oxidation of CO in a hydrogen-enriched atmosphere with high selectivity and high CO conversion in a significantly wider temperature range (for example, possibly in a wide temperature range of −80 to 200° C.) compared to the existing catalysts.

More particularly, the wide-temperature high-performance catalyst for preferential oxidization of CO in a hydrogen-enriched atmosphere provided by this invention comprises a carrier, a noble metal active component, and a non-noble metal oxide promoter, wherein the carrier is an oxide or a carbon-based material; the noble metal active component is one or more selected from Pt, Ir, Ru, Rh, and Pd (i.e., Pt-group noble metals); and the non-noble metal oxide promoter is one or more selected from iron oxide ($FeO_x$), cobalt oxide ($CoO_x$), and nickel oxide ($NiO)_x$ (wherein the subscript x merely represents an atomic coefficient of O in the corresponding oxide formed, and is well-known by the person skilled in the art and is not limited to a specific value), and wherein the noble metal active component has a content of 0.1 to 10 wt % and preferably 1 to 5 wt %, and the non-noble metal oxide promoter has a content of 0.01 to 10 wt % and preferably 0.1 to 10 wt % in terms of a metal element, based on the total weight of the wide-temperature catalyst.

In this invention, the supported Pt-group noble metal catalyst precursor is not particularly limited. It may be commercially available or a commercial supported catalyst, or may be a supported catalyst precursor prepared by impregnation, ion exchange, precipitation, sol-gel, and the like that are well known in the art.

In this invention, the carrier is not particularly required, as long as it can carry the noble metal active component described above. Commonly or preferably, the carrier is one or more selected from $SiO_2$, $Al_2O_3$, $TiO_2$, MgO, $CeO_2$, $ZrO_2$, activated carbon, carbon black, graphene, and carbon nanotubes. Here, $SiO_2$, $Al_2O_3$, $TiO_2$, $CeO_2$, $ZrO_2$, or activated carbon is more preferable, and $SiO_2$ is most preferable.

In this invention, the non-noble metal oxide promoter is deposited onto the surface of a supported Pt-group noble metal catalyst precursor by chemical vapor deposition or atomic layer deposition, without being limited by any theory. Here, one theory for the promoter nucleation is as follows. Since Pt-group metal particles typically exhibit a high catalytic activity, when the vapor of a metal precursor of an oxide promoter is introduced onto the surface of a supported Pt-group noble metal catalyst precursor, the metal precursor of the oxide promoter typically dissociatively adsorbs onto the surface of the Pt-group metal particles; and thereafter, the ligand of the metal precursor of the oxide promoter may be effectively removed by using an oxidizing agent or a reducing agent to form a Pt-group noble metal active component-oxide promoter interface.

Preferably, the deposition of the non-noble metal oxide promoter comprises the steps of:

(a) placing the supported catalyst precursor in a reactor or a reaction chamber and heating to an appropriate temperature (for example, 20 to 500° C.), and then introducing an appropriate dosage of vapor of a promoter precursor to adsorb onto the surface of the supported catalyst precursor;

(b) introducing an appropriate dosage of an oxidizing or reducing agent (depending on the requirement for converting the promoter precursor to the oxide promoter, i.e., introducing an oxidizing agent if this reaction is an oxidation reaction; and introducing a reducing agent if this reaction is a reduction reaction), to allow a chemical reaction between the oxidizing agent or the reducing agent and the promoter precursor adsorbed on the surface of the catalyst precursor, so as to achieve deposition of the oxide promoter on the surface of the catalyst and thereby obtain a desired wide-temperature catalyst; and (c) optionally, repeating the above steps (a) and (b) one or more times (depositing by one cycle or a plurality of cycles) sequentially or simultaneously to regulate the mass content of the oxide promoter in the wide-temperature catalyst.

More preferably, the deposition or addition of the oxide promoter is achieved by an atomic layer deposition method. More preferably, the deposition therein comprises the steps of:

(1) placing the supported catalyst precursor in a reactor or a reaction chamber and heating to a certain temperature (for example, 20 to 500° C.), and then introducing an appropriate dosage of vapor of a promoter precursor to adsorb onto the surface of the supported catalyst precursor;

(2) optionally purging the reactor or the reaction chamber with an inert gas to purge and remove the unreacted promoter precursor and other reaction products remaining therein;

(3) introducing an appropriate dosage of an oxidizing agent or a reducing agent, allowing a chemical reaction between the oxidizing agent or the reducing agent and the promoter precursor adsorbed on the surface of the catalyst precursor to occur, so as to achieve controllable deposition of the oxide promoter on the surface of the catalyst precursor;

(4) optionally purging the reactor or the reaction chamber with an inert gas to purge and remove the oxidizing agent or the reducing agent and other reaction products remaining therein and thereby obtain the wide-temperature catalyst; and (5) optionally, repeating the above steps (1) to (4) one or more times (depositing by one cycle or a plurality of cycles) sequentially to regulate the mass content of the oxide promoter in the wide-temperature catalyst.

In this invention, during the deposition of the oxide promoter, only one oxide promoter may be deposited, or two or three oxide promoters may be also deposited. Additionally, these oxide promoters may be deposited in separate deposition cycles, or may be deposited in the same or several deposition cycle(s) simultaneously.

In this invention, the promoter precursor to be deposited by chemical vapor deposition or atomic layer deposition is as follows.

As an iron precursor of an iron oxide promoter, it is preferably one or more selected from ferrocene, vinyl ferrocene, ethyl ferrocene, amino ferrocene, dimethylamino ferrocene, iron acetylacetonate, bis(2,4-dimethylpentadienyl) iron, (2,2,6,6-tetramethyl-3,5-pentanedionato) iron (III), bis(N,N'-di-t-butylacetamidinyl) iron, iron carbonyl, and iron t-butoxide. Among these, a particularly preferred iron precursor is ferrocene.

As a cobalt precursor of a cobalt oxide promoter, it is preferably one or more selected from cobaltocene, cobalt acetylacetonate, bis(N,N'-diisopropylacetamidinyl) cobalt, dicarbonylcyclopentadienyl cobalt, t-butyltricarbonyl cobalt, (2,2,6,6-tetramethyl-3,5-pentanedionato) cobalt, and cobalt 2-methoxyethoxide. Among these, a particularly preferred cobalt precursor is cobaltocene.

As a nickel precursor of a nickel oxide promoter, it is preferably one or more selected from nickelocene, nickel acetylacetonate, bis(N,N'-diisopropylacetamidinyl) nickel, (2,2,6,6-tetramethyl-3,5-pentanedionato) nickel(II), dibutyldithiocarbamate nickel(II), and nickel 2-methoxyethoxide. Among these, a particularly preferred nickel precursor is nickelocene.

In this invention, the oxidizing agent used in the deposition of the oxide promoter is preferably one or more selected from $O_2$, $O_3$, $H_2O$, $H_2O_2$, NO, and $NO_2$, and the reducing agent is preferably one or more selected from $H_2$, $NH_3$, and $N_2H_4$. Here, more preferably, the oxidizing agent or the reducing agent is selected from $O_2$, $O_3$, $H_2O$, $H_2O_2$, $H_2$, or $NH_3$.

In this invention, the inert gas is $N_2$, Ar, He, or a combination thereof, and is preferably $N_2$. In this invention, during the deposition of the oxide promoter, the heating temperature of the reactor or the reaction chamber, or the temperature of the supported catalyst precursor is preferably 20 to 500° C., more preferably 50 to 350° C., and most preferably 100 to 200° C.

In this invention, the number of deposition or the cycle number of deposition is not particularly limited, and deposition may be performed one or more cycles as necessary.

Preferably, the number of the deposition cycle of the oxide promoter is 1 to 50, more preferably 1 to 20, and most preferably 1 to 10.

In this invention, the composition of the hydrogen-enriched atmosphere where the wide-temperature catalyst is applied is not particularly limited. Typically, in the applications of the wide-temperature catalyst in preferential oxidation of CO in a hydrogen-enriched reaction atmosphere, the content of CO is less than 5%, the content of $H_2$ is greater than 10%, and the volume ratio of CO to $O_2$ is in a range of 1:0.5-2. Preferably, with respect to a hydrogen source atmosphere used for a hydrogen fuel cell, the content of CO therein is less than 5%, the content of $H_2$ is greater than 30%, and the volume ratio of CO to $O_2$ is in a range of 1:0.5-1.

Preferably, before the wide-temperature catalyst of this invention is used, this wide-temperature catalyst is subjected to a pretreatment. For example, the pretreatment is catalyst reduction in hydrogen at a temperature of 100 to 600° C. for 0.5 to 5 hours. More preferably, the pretreatment process is catalyst reduction in hydrogen at a temperature of 200 to 300° C. for 0.5 to 2 hours. Further preferably, the pretreatment is catalyst reduction in hydrogen at a temperature of 200 to 300° C. for 0.5 to 2 hours, followed by further treatment with a hydrogen-enriched atmosphere reaction gas at room temperature to a temperature of 300° C. (for example, a temperature of 100 to 200° C.) for 0.1 to 5 hours (for example, 0.2 to 1 hour).

The advantages of this invention include, but are not limited to, the following aspects:

The method for depositing an oxide promoter provided by this invention has a good repeatability and a broad applicability, and is suitable for any supported Pt-group noble metal catalyst, including commercially available (commercial) supported Pt-group noble metal (Pt, Ir, Ru, Rh, Pd) catalysts or various supported Pt-group noble metal (Pt, Ir, Ru, Rh, Pd) catalysts prepared by impregnation, ion exchange, precipitation, sol-gel method, and etc.

The method for oxide promoter deposition provided by this invention is very straightforward. One simple step of oxide promoter deposition using chemical vapor deposition or atomic layer deposition may achieve great improvement in the performance of Pt-group noble metal (Pt, Ir, Ru, Rh, and Pd) supported catalysts.

In the method for oxide promoter deposition provided by this invention, the metal organic precursor of an oxide promoter has a low price, which allows achieving great improvement of catalyst performance with a relatively low cost.

After an oxide promoter is deposited on the surface of a conventional supported Pt-group noble metal (Pt, Ir, Ru, Rh, Pd) catalyst using chemical vapor deposition, particularly atomic layer deposition in this invention, the catalyst obtained may achieve oxidation of CO in a hydrogen-enriched atmosphere with high selectivity and high CO conversion in a wide temperature range (for example, possibly in a temperature range of −80 to 200° C.). The operating temperature range is the widest operating temperature window by far. In addition, the wide-temperature catalyst of this invention can remain stable for a long time in the presence of steam and $CO_2$.

This invention will be further illustrated below by Examples, but this invention is not limited to the following Examples.

Example 1: Preparation of Pt-1cFeO$_x$/SiO$_2$ Catalyst and Activity Test for Preferential Oxidation of CO in Hydrogen-Enriched Atmosphere Preparation of Pt/SiO$_2$ catalyst precursor: The Pt/SiO$_2$ catalyst precursor was synthesized using atomic layer deposition in a viscous flow atomic layer deposition reactor (Arradiance). The temperature of atomic layer deposition was 250° C. The Pt precursor was (trimethyl)methylcyclopentadienyl platinum (IV) (MeCpPtMe$_3$, Strem Chemicals), which was put in a container heated to 70° C. with a heating jacket to obtain a sufficient vapor pressure of MeCpPtMe$_3$. The oxidizing agent was high-purity $O_2$ (99.999%, Nanjing Specialty Gas), and the inert gas was high-purity $N_2$ (99.999%, Nanjing Specialty Gas). During the catalyst precursor synthesis, 700 mg of a SiO$_2$ carrier (300 m$^2$/g, Alfa Aesar) was placed in the reaction chamber, and (a) the vapor of MeCpPtMe$_3$ was introduced to the reaction chamber by using high-purity $N_2$ as a carrier gas for 10 minutes; (b) after the source of MeCpPtMe$_3$ was closed, a high-purity $N_2$ gas was used to purge the chamber for 5 minutes; (c) next, high-purity $O_2$ was introduced to the reaction chamber for 3 minutes; and (d) the source of $O_2$ was then closed, and a high-purity $N_2$ gas was used for to purge the chamber for 5 minutes. The above steps (a-d) were repeated twice, i.e., 2 cycles of atomic layer deposition were performed. After Pt deposition, the sample was taken out from the reaction chamber to obtain a Pt/SiO$_2$ catalyst precursor. Here, the mass content of Pt was 3.6 wt %, and the particle size of Pt was 2.7±0.4 nm, according to the results of high-resolution transmission electron microscope.

Deposition of FeO$_x$ promoter: The temperature of the reaction chamber of atomic layer deposition (a viscous flow reactor, Arradiance) was heated to 120° C. by ohmic heating. The metal precursor of FeO$_x$ promoter was ferrocene (FeCp$_2$, Sigma Aldrich). The temperature of a ferrocene container was heated to 90° C. by using a heating jacket to obtain a sufficient vapor pressure of ferrocene. 500 mg of the Pt/SiO$_2$ sample was placed in the reaction chamber. The shut valve between a ferrocene container and the atomic layer deposition reaction chamber was opened, and the vapor of ferrocene was introduced to the atomic layer deposition reaction chamber using high-purity $N_2$ (99.999%, Nanjing Specialty Gas) as a carrier gas. Ferrocene was adsorbed on the surface of Pt particles in the Pt/SiO$_2$ catalyst precursor, thus achieving the nucleation of Fe on the surface of Pt. The time for ferrocene introduction was 5 minutes. After the shut valve was closed, high-purity $O_2$ (99.999%, Nanjing Specialty Gas) as an oxidizing agent was introduced to the reaction chamber for 3.3 minutes to combust away the organic ligand of ferrocene adsorbed on the surface of Pt through oxidation. As a result, ferrocene was converted to $FeO_x$, yielding the deposition of $FeO_x$ on the surface of catalyst.

Finally, the sample was taken out from the reaction chamber to obtain a Pt-1c$FeO_x$/$SiO_2$ wide-temperature catalyst (the mass content of Pt was still 3.6 wt %), and the mass content of the $FeO_x$ promoter was 0.1 wt % in terms of iron element.

Activity test 1: Activity test was performed in a fixed bed flow U-shape quartz tube (self-made) reactor for the reaction of preferential oxidation of CO in a hydrogen-enriched atmosphere. 100 mg of the Pt-1c$FeO_x$/$SiO_2$ catalyst obtained in Example 1 and 1 g of quartz chips were firstly ground and uniformly mixed (to prevent the formation of "hot spots" during reaction). Catalyst pretreatment: the treatment was performed in a 10% $O_2$/He atmosphere at 200° C. for 1 hour, and then reduction in 10% $H_2$/He for another 2 hours, and activation in a reaction stream of 1% CO+0.5% $O_2$+48% $H_2$+50.5% He for another 20 min. The reaction gas mixture for the activity test was consisted of 1% CO+0.5% $O_2$+48% $H_2$+50.5% He, and the flow rate of the reaction gas was 60 mL/min. The catalyst was subjected to an activity test in a temperature range of −80 to 200° C., and the test results were shown in FIG. 1. As seen from FIG. 1, high conversions of CO in a hydrogen-enriched atmosphere could be achieved in a temperature range of −80 to 200° C. by using the wide-temperature catalyst prepared in this invention.

Figure 2:
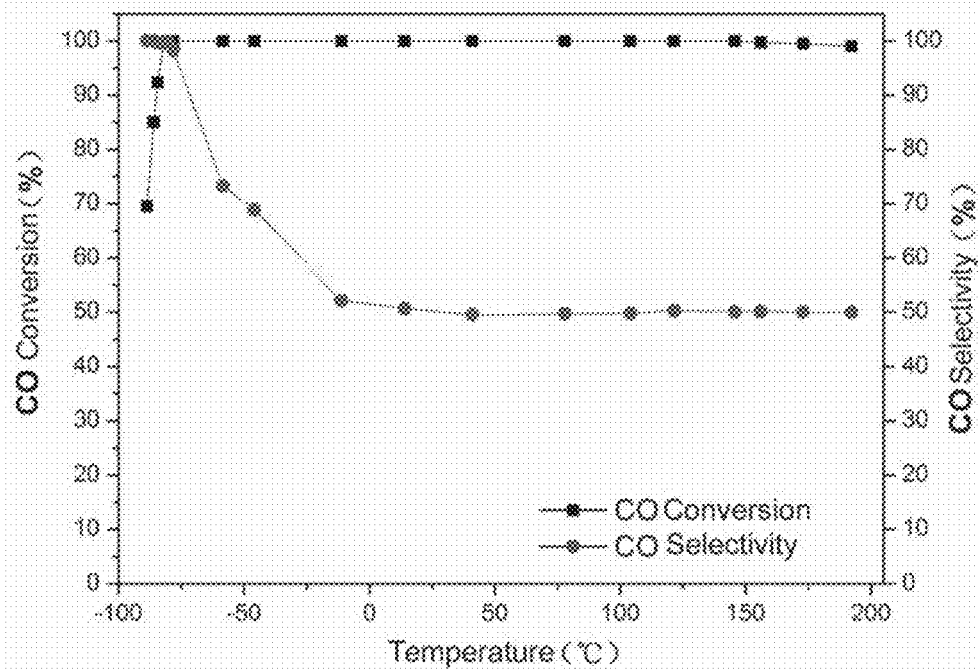
FIG. 2 shows a plot of CO conversion and CO selectivity in preferential oxidation of CO in a hydrogen-enriched atmosphere over a Pt-1cFeO$_x$/SiO$_2$ wide-temperature catalyst prepared according to Example 1 of this invention, wherein the volume ratio of CO:O$_2$:H$_2$ is 1:1:48 for the hydrogen-enriched reaction gas sample used therein.

Activity test 2: The Pt-1c$FeO_x$/$SiO_2$ catalyst described above was further subjected to another test for preferential oxidation of CO in a hydrogen-enriched atmosphere with a procedure similar to that in activity test 1, wherein the usage amount of the catalyst and the pretreatment process were the same as those described above, except that the constitution of the reaction gas sample was adjusted to 1% CO+1% $O_2$+48% $H_2$30 50% He and the flow rate of the reaction gas was 60 mL/min. The results of the activity test were shown in FIG. 2. As seen from this FIG. 2, preferential complete conversion of CO in a hydrogen-enriched atmosphere could be achieved in a temperature range of −80 to 200° C. by using the wide-temperature catalyst prepared in this invention.

Figure 3:
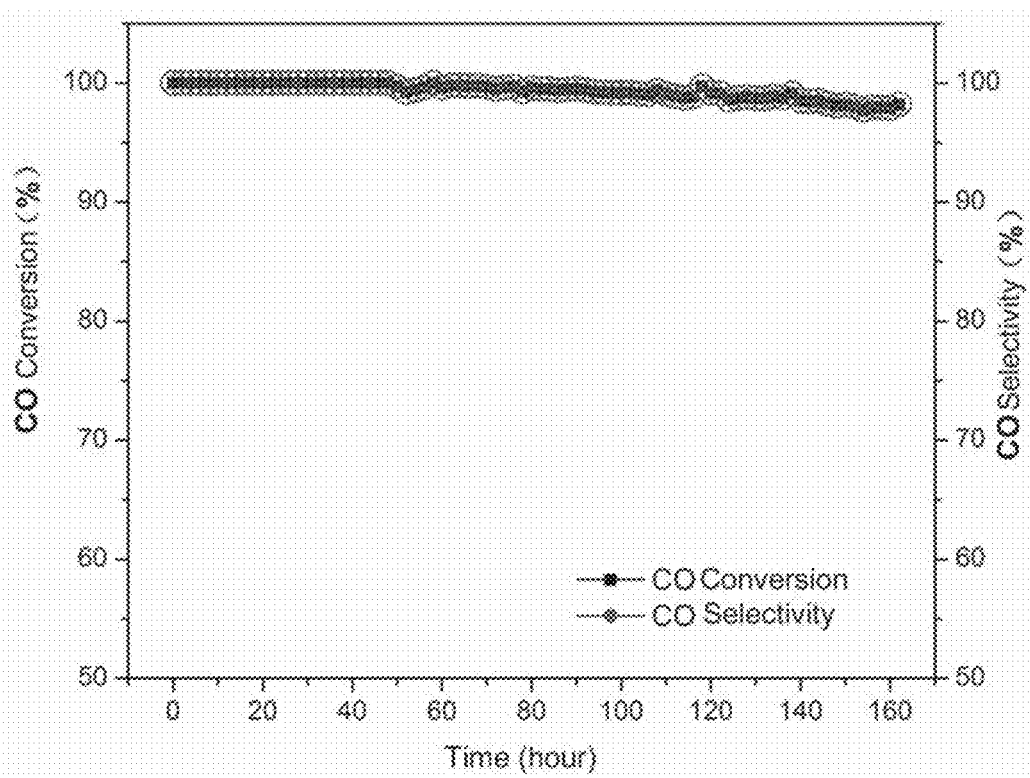
FIG. 3 shows a plot of stability of a Pt-1cFeO$_x$/SiO$_2$ wide-temperature catalyst prepared according to Example 1 of this invention at a temperature of 80° C. in a case where a hydrogen-enriched reaction gas sample also contains steam (H$_2$O) and CO$_2$.

Stability test: The Pt-1c$FeO_x$/$SiO_2$ catalyst described above was further subjected to a stability test, wherein the usage amount of the catalyst and the pretreatment process were described in activity test 1. The total flow rate of the reaction gas in the stability test was 60 mL/min, the constitution of the gas was 1% CO+0.5% $O_2$+48% $H_2$+3% $H_2O$+ 20% $CO_2$+27.5% He (a simulation of the constitution of the hydrogen fuels used for fuel cells). The reaction temperature was fixed at 80° C. and the sample was continuously tested for 160 hours. The results of the stability test were shown in FIG. 3. As seen from FIG. 3, the catalyst could remain active for a long time in a hydrogen-enriched atmosphere containing water and $CO_2$ without showing any significant deactivation.

Example 2: Preparation of Pt-5c$FeO_x$/$SiO_2$ Catalyst and Activity Test for Preferential Oxidation Reaction of CO in Hydrogen-Enriched Atmosphere Preparation of Pt/$SiO_2$ catalyst precursor: Firstly, tetraethyl orthosilicate was used as a raw material to synthesize monodispersed silicon dioxide spheres ($SiO_2$) by basic hydrolysis. Then, the synthesized silicon dioxide spheres were calcined at 300° C. Thereafter, 3-aminopropyl-triethoxy silane (ATPES) was used to modify the surface of the silicon dioxide spheres after calcination (ATPES-$SiO_2$). 1.4 g of ATPES-$SiO_2$ and 7.9 mL of chloroplatinic acid were added to 30 mL of ethanol, and stirred at room temperature for 24 hours. After centrifugation, the materials were dried and then reduced in a 10% $H_2$/Ar atmosphere at 350° C. to obtain Pt/$SiO_2$ (WI) catalyst precursor. Here, the mass content of Pt in the catalyst precursor was 3.2 wt %, and the particle size of Pt was about 3 nm.

Deposition of $FeO_x$ promoter: The temperature of the reaction chamber of atomic layer deposition (a viscous flow reactor, Arradiance) was heated to 120° C. by ohmic heating. The metal precursor of $FeO_x$ promoter was ferrocene ($FeCp_2$, Sigma Aldrich). The temperature of a ferrocene container was heated to 90° C. by using a heating jacket to obtain a sufficient vapor pressure of ferrocene. 150 mg of the Pt/$SiO_2$ sample was placed in the reaction chamber. (a) The shut valve between a ferrocene container and the reaction chamber was opened, and the vapor of ferrocene was introduced to the reaction chamber using high-purity $N_2$ (99.999%, Nanjing Specialty Gas) as a carrier gas. Ferrocene was adsorbed on the surface of Pt particles in the Pt/$SiO_2$ catalyst precursor, thus achieving the nucleation of Fe on the surface of Pt. The time for ferrocene introduction was 2.5 minutes. (b) After the shut valve was closed, high-purity $N_2$ (99.999%, Nanjing Specialty Gas) was used to purge the reaction chamber for 5 minutes. (c) High-purity $O_2$ (99.999%, Nanjing Specialty Gas) as an oxidizing agent was introduced to the reaction chamber for 2 minutes, as an oxidizing agent was introduced to the reaction chamber for 5 minutes to combust away the organic ligand of ferrocene adsorbed on the surface of Pt through oxidation. As a result, ferrocene was converted to $FeO_x$, which was formed on the surface of the catalyst. (d) Purging the chamber with high-purity $N_2$ gas for 5 minutes. The above steps (a-d) were repeated 5 times, i.e., 5 cycles of atomic layer deposition were performed. The sample was taken out from the reaction chamber to obtain the Pt-5c$FeO_x$/$SiO_2$ catalyst. In this catalyst obtained, the mass content of Pt remained to be 3.2 wt %, which was almost unchanged, and the mass content of the $FeO_x$ promoter was 0.15 wt % in terms of iron element.

Figure 4:
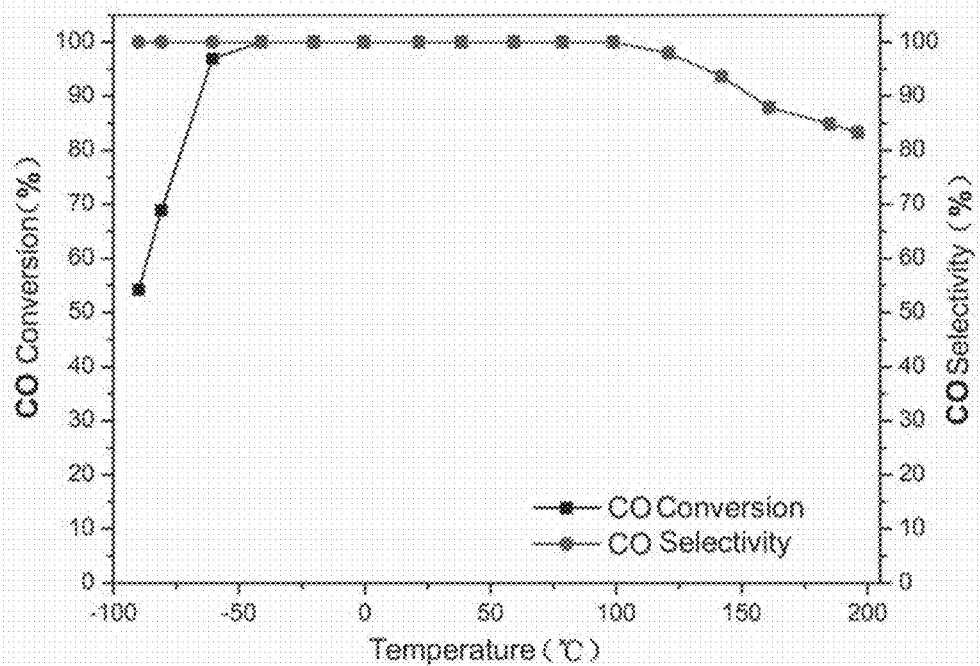
FIG. 4 shows a plot of CO conversion and CO selectivity in preferential oxidation of CO in a hydrogen-enriched atmosphere over a Pt-5cFeO$_x$/SiO$_2$ wide-temperature catalyst prepared according to Example 2 of this invention, wherein the volume ratio of CO:O$_2$:H$_2$ is 1:0.5:48 for the hydrogen-enriched reaction gas sample used therein.

Activity test for preferential oxidation reaction of CO in hydrogen-enriched atmosphere: The volume ratio of CO:$O_2$: $H_2$ in the reaction gas was 1:0.5:48. Catalyst: 100 mg of the Pt-5c$FeO_x$/$SiO_2$ catalyst described above and 1 g of quartz sand were first ground and uniformly mixed. Reactor: a U-shape quartz tube. Catalyst pretreatment: the treatment was performed in a 10% $O_2$/He atmosphere at 200° C. for 1 hour, then reduced in 10% $H_2$/He for another 2 hours and finally activated in the reaction stream of 1% CO+0.5% $O_2$+48% $H_2$+50.5% He for 20 minutes. Composition of the reaction gas: 1% CO+0.5% $O_2$+48% $H_2$+50.5% He, and the flow rate of the reaction gas was 60 mL/min. The catalyst was subjected to an activity test in a temperature range of −80 to 200° C., and the test results were shown in FIG. 4. As seen from FIG. 4, high conversion of CO in a hydrogen-enriched atmosphere could be achieved in a temperature range of −80 to 200° C. by using the wide-temperature catalyst prepared in this invention.

Examples 3-8: Preparation of Pt-3c$FeO_x$/$SiO_2$ Catalysts and Activity Test for Preferential Oxidation Reaction of CO in Hydrogen-Enriched Atmosphere The same procedures as those of Example 2 were performed, except that dimethylamino ferrocene (CpFeC$_5$H$_4$CHN(CH$_3$)$_2$, Sigma Aldrich), bis(2,4-dimethylpentadienyl) iron (Fe(2,4-C$_7$H$_{11}$)$_2$, self-synthesized), (2,2,6,6-tetramethyl-3,5-pentanedionato) iron(III) (Fe(thd)$_3$, Alfa Aesar), bis(N,N'-di-t-butyl acetamidinyl) iron (Strem Chemicals), iron carbonyl (Fe(CO)$_5$, Sigma Aldrich), and iron t-butoxide (Fe$_2$(O$^t$Bu)$_6$, Sigma Aldrich) were used as the iron precursor of the FeO promoter, respectively, instead of ferrocene (FeCp$_2$, Sigma Aldrich) and the cycle number of deposition was 3 so as to obtain six corresponding Pt-3cFeO$_x$/SiO$_2$ catalyst samples. In these six catalyst samples obtained, the mass content of Pt was 3.2 wt %, and the mass content of the FeO$_x$ promoter was 0.18 wt %, 0.14 wt %, 0.15 wt %, 0.2 wt %, 0.3 wt %, and 0.26 wt % in terms of iron element, respectively.

Each of the catalysts obtained above exhibited the achievements of high conversion of CO in a hydrogen-enriched atmosphere in a wide temperature range similar to that in Example 2 under the same procedures and conditions as those in Example 2, in an activity test for preferential oxidation reaction of CO in a hydrogen-enriched atmosphere.

Example 9: Preparation of Pt-1cFeO$_x$/C Catalyst and Activity Test for Preferential Oxidation Reaction of CO in Hydrogen-Enriched Atmosphere Preparation of Pt/C catalyst precursor: This Pt/C catalyst precursor was a commercial catalyst purchased from Sigma Aldrich. In the catalyst, the mass content of Pt was 5 wt %, and the particle size of Pt was 2.1±0.3 nm according to the high-resolution transmission electron microscopic measurements.

Deposition of FeO$_x$ promoter: The temperature of the reaction chamber of atomic layer deposition (a viscous flow reactor, Arradiance) was heated to 120° C. by ohmic heating. The metal precursor of FeO$_x$ promoter was ferrocene (FeCp$_2$, Sigma Aldrich). The temperature of a ferrocene container was heated to 90° C. by using a heating jacket to obtain a sufficient vapor pressure of ferrocene. 200 mg of the Pt/C sample was placed in the reaction chamber. The shut valve between a ferrocene container and the reaction chamber was opened, and the vapor of ferrocene was introduced to the reaction chamber using high-purity N$_2$ (99.999%, Nanjing Specialty Gas) as a carrier gas. Ferrocene was adsorbed on the surface of Pt particles in the Pt/C catalyst precursor, thus achieving the nucleation of Fe on the surface of Pt. The time for ferrocene introduction was 2.5 minutes. After the shut valve was closed, high-purity O$_2$ (99.999%, Nanjing Specialty Gas) as an oxidizing agent was introduced to the reaction chamber for 3 minutes to combust away the organic ligand of ferrocene adsorbed on the surface of Pt through oxidation. As a result, ferrocene was converted to FeO$_x$, yielding the deposition of FeO$_x$ on the surface of catalyst. The sample was taken out from the reaction chamber to obtain the Pt-1cFeO$_x$/C catalyst. In this catalyst obtained, the mass content of the FeO$_x$ promoter was 8.6 wt % in terms of iron element.

Figure 5:
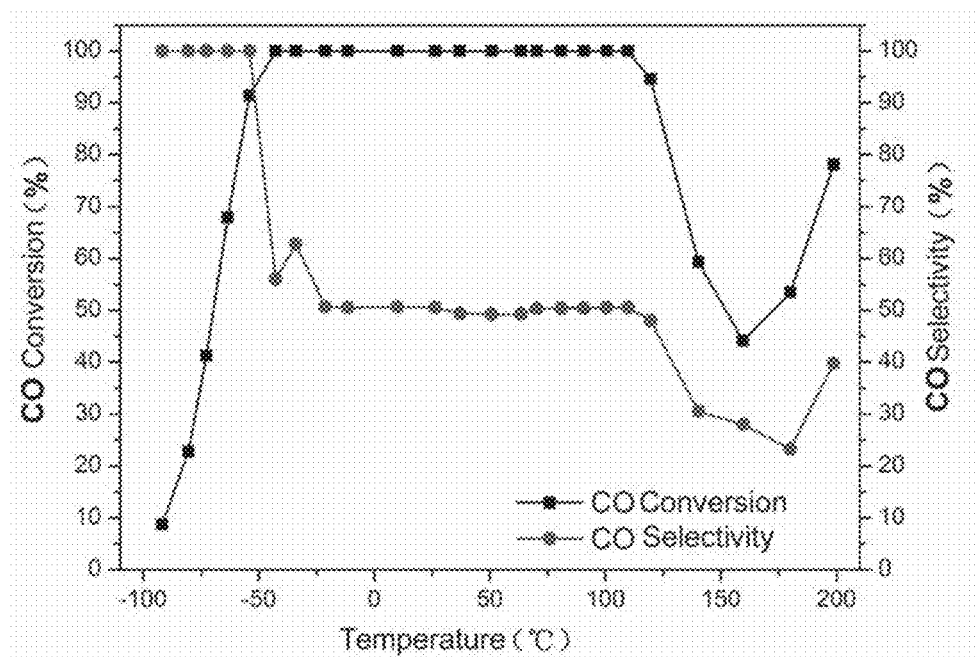
FIG. 5 shows a plot of CO conversion and CO selectivity in preferential oxidation of CO in a hydrogen-enriched atmosphere over a Pt-1cFeO$_x$/C wide-temperature catalyst prepared according to Example 9 of this invention, wherein the volume ratio of CO:O$_2$:H$_2$ is 1:1:48 for the hydrogen-enriched reaction gas sample used therein.

Activity test for preferential oxidation reaction of CO in hydrogen-enriched atmosphere: The volume ratio of CO:O$_2$:H$_2$ in the reaction gas was 1:1:48. Catalyst: 100 mg of the Pt-1cFeO$_x$/C catalyst described above and 1 g of quartz sand were firstly ground and uniformly mixed. Reactor: a U-shape quartz tube. Catalyst pretreatment: the treatment was performed in a 10% O$_2$/He atmosphere at 200° C. for 1 hour, then reduced in 10% H$_2$/He for another 2 hours and finally activated in the reaction stream of 1% CO+1% O$_2$+48% H$_2$+50.5% He for 20 minutes. Composition of the reaction gas: 1% CO+1% O$_2$+48% H$_2$+50% He, and the flow rate of the reaction gas was 60 mL/min. The catalyst was subjected to an activity test in a temperature range of −80 to 200° C., and the test results were shown in FIG. 5. Complete conversion of CO was achieved in a wide temperature range of −50 to 120° C. by using the wide-temperature catalyst prepared in this invention.

Example 10: Preparation of Pt-1cFeO$_x$/TiO$_2$ Catalyst and Activity Test for Preferential Oxidation Reaction of CO in Hydrogen-Enriched Atmosphere Preparation of Pt/TiO$_2$ catalyst precursor: It was obtained by using an atomic layer deposition method. A viscous flow atomic layer deposition reactor (Arradiance) was used, the temperature of atomic layer deposition was 250° C., and the Pt precursor in the experiment was (trimethyl) methylcyclopentadienyl platinum (IV) (MeCpPtMe$_3$, Strem Chemicals), which was put in a container heated to 70° C. with a heating jacket to obtain a sufficient vapor pressure of MeCpPtMe$_3$. The oxidizing agent was high-purity O$_2$ (99.999%, Nanjing Specialty Gas), and the inert gas was high-purity N$_2$ (99.999%, Nanjing Specialty Gas). During the catalyst precursor synthesis, 700 mg of a TiO$_2$ carrier (50 m$^2$/g, Degussa) was loaded into the reaction chamber, and (a) the vapor of MeCpPtMe$_3$ was introduced to the reaction chamber by using high-purity N$_2$ as a carrier gas for 4 minutes; (b) after the source of MeCpPtMe$_3$ was closed, a high-purity N$_2$ gas was used to purge the chamber for 5 minutes; (c) next, high-purity O$_2$ was introduced to the reaction chamber for 2 minutes; and (d) the source of O$_2$ was then closed, and a high-purity N$_2$ gas was used for to purge the chamber for 5 minutes. The above steps (a-d) were repeated twice, i.e., 2 cycles of atomic layer deposition were performed. After Pt deposition, the sample was taken out from the reaction chamber to obtain a Pt/TiO$_2$ catalyst precursor. Here, the mass content of Pt was 3.7 wt %, and the particle size of Pt was about 3 nm according to the results of high-resolution transmission electron microscope.

Deposition of FeO$_x$ promoter: The temperature of the reaction chamber of atomic layer deposition (a viscous flow reactor, Arradiance) was heated to 120° C. by ohmic heating. The metal precursor of FeO$_x$ promoter was ferrocene (FeCp$_2$, Sigma Aldrich). The temperature of a ferrocene container was heated to 90° C. by using a heating jacket to obtain a sufficient vapor pressure of ferrocene. 200 mg of the Pt/TiO$_2$ sample was placed in the reaction chamber. The shut valve between a ferrocene container and the reaction chamber was opened, and the vapor of ferrocene was introduced to the reaction chamber using high-purity N$_2$ (99.999%, Nanjing Specialty Gas) as a carrier gas. Ferrocene was adsorbed on the surface of Pt particles in the Pt/TiO$_2$ catalyst precursor, thus achieving the nucleation of Fe on the surface of Pt. The time for ferrocene introduction was 2.5 minutes. After the shut valve was closed, high-purity O$_2$ (99.999%, Nanjing Specialty Gas) as an oxidizing agent was introduced to the reaction chamber for 3 minutes to combust away the organic ligand of ferrocene adsorbed on the surface of Pt through oxidation. As a result, ferrocene was converted to FeO$_x$, yielding the deposition of FeO$_x$ on the surface of catalyst. The sample was taken out from the reaction chamber to obtain the Pt-1cFeO$_x$/TiO$_2$ catalyst. In this catalyst obtained, the mass content of Pt remained to be 3.7 wt %, which was almost unchanged, and the mass content of the FeO$_x$ promoter was 0.17 wt % in terms of iron element.

Figure 6:
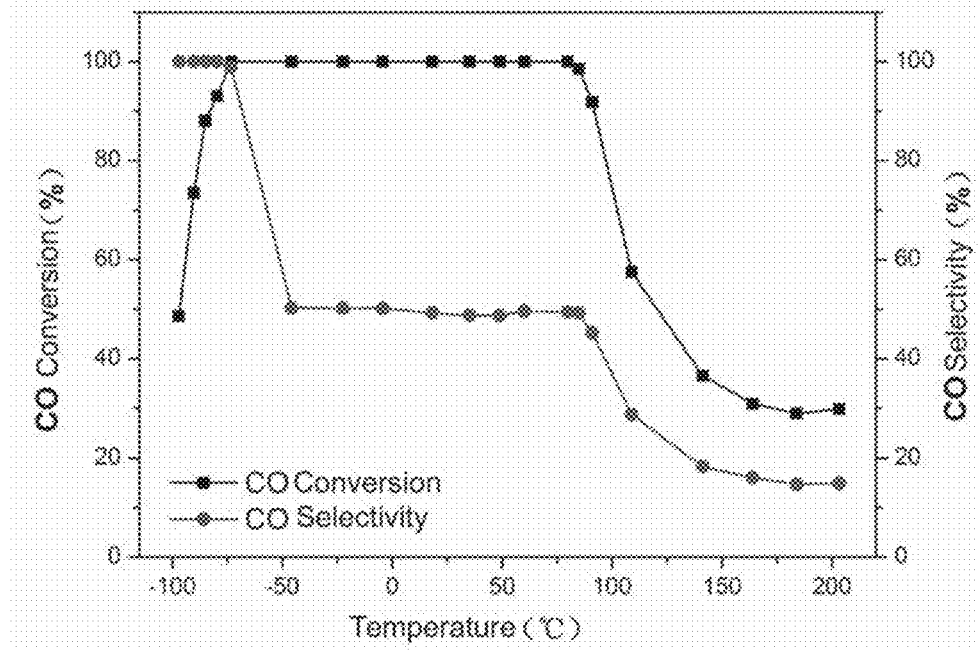
FIG. 6 shows a plot of CO conversion and CO selectivity in preferential oxidation of CO in a hydrogen-enriched atmosphere over a Pt-1cFeO$_x$/TiO$_2$ wide-temperature catalyst prepared according to Example 10 of this invention, wherein the volume ratio of CO:O$_2$:H$_2$ is 1:1:48 for the hydrogen-enriched reaction gas sample used therein.

Activity test for preferential oxidation reaction of CO in hydrogen-enriched atmosphere: The volume ratio of CO:O$_2$:

H$_2$ in the reaction gas was 1:1:48. Catalyst: 100 mg of the Pt-1cFeO$_x$/TiO$_2$ catalyst described above and 1 g of quartz sand were firstly ground and uniformly mixed. Reactor: a U-shape quartz tube. Catalyst pretreatment: the treatment was performed in a 10% O$_2$/He atmosphere at 200° C. for 1 hour, then reduced in 10% H$_2$/He for another 2 hours and finally activated in the reaction stream of 1% CO+1% O$_2$+48% H$_2$+50.5% He for 20 minutes. Composition of the reaction gas: 1% CO+1% O$_2$+48% H$_2$+50% He, and the flow rate of the reaction gas was 60 mL/min. The catalyst was subjected to an activity test in a temperature range of −80 to 200° C., and the test results were shown in FIG. 6. Complete conversion of CO was achieved in a temperature range of −70 to 100° C. by using the wide-temperature catalyst prepared in this invention.

Example 11: Preparation of Pt-1FeO$_x$/Al$_2$O$_3$ Catalyst and Activity for Preferential Oxidation Reaction of CO in Hydrogen-Enriched Atmosphere Preparation of Pt/Al$_2$O$_3$ catalyst precursor: It was obtained by using an atomic layer deposition method. A viscous flow atomic layer deposition reactor (Arradiance) was used, the temperature of atomic layer deposition was 250° C., and the Pt precursor in the experiment was (trimethyl) methylcyclopentadienyl platinum (IV) (MeCpPtMe$_3$, Strem Chemicals), which was put in a container heated to 70° C. with a heating jacket to obtain a sufficient vapor pressure of MeCpPtMe$_3$. The oxidizing agent was high-purity O$_2$ (99.999%, Nanjing Specialty Gas), and the inert gas was high-purity N$_2$ (99.999%, Nanjing Specialty Gas). During the catalyst precursor synthesis, 400 mg of a Al$_2$O$_3$ carrier (50 m$^2$/g, Alfa Aesar) was loaded into the reaction chamber, and (a) the vapor of MeCpPtMe$_3$ was introduced to the reaction chamber by using high-purity N$_2$ as a carrier gas for 3 minutes; (b) after the source of MeCpPtMe$_3$ was closed, a high-purity N$_2$ gas was used to purge the chamber for 5 minutes; (c) next, high-purity O$_2$ was introduced to the reaction chamber for 2 minutes; and (d) the source of O$_2$ was then closed, and a high-purity N$_2$ gas was used for to purge the chamber for 5 minutes. The above steps (a-d) were repeated twice, i.e., 2 cycles of atomic layer deposition were performed. After Pt deposition, the sample was taken out from the reaction chamber to obtain a Pt/Al$_2$O$_3$ catalyst precursor. Here, the mass content of Pt was 3.7 wt %, and the particle size of Pt was about 3 nm according to the results of high-resolution transmission electron microscope.

Deposition of FeO$_x$ promoter: The temperature of the reaction chamber of atomic layer deposition (a viscous flow reactor, Arradiance) was heated to 120° C. by ohmic heating. The metal precursor of FeO$_x$ promoter was ferrocene (FeCp$_2$, Sigma Aldrich). The temperature of a ferrocene container was heated to 90° C. by using a heating jacket to obtain a sufficient vapor pressure of ferrocene. 200 mg of the Pt/Al$_2$O$_3$ sample was placed in the reaction chamber. The shut valve between a ferrocene container and the reaction chamber was opened, and the vapor of ferrocene was introduced to the reaction chamber using high-purity N$_2$ (99.999%, Nanjing Specialty Gas) as a carrier gas. Ferrocene was adsorbed on the surface of Pt particles in the Pt/Al$_2$O$_3$ catalyst precursor, thus achieving the nucleation of Fe on the surface of Pt. The time for ferrocene introduction was 2.5 minutes. After the shut valve was closed, high-purity O$_2$ (99.999%, Nanjing Specialty Gas) as an oxidizing agent was introduced to the reaction chamber for 3 minutes to combust away the organic ligand of ferrocene adsorbed on the surface of Pt through oxidation. As a result, ferrocene was converted to FeO$_x$, yielding the deposition of FeO$_x$ on the surface of catalyst. The sample was taken out from the reaction chamber to obtain the Pt-1cFeO$_x$/Al$_2$O$_3$ catalyst. In this catalyst obtained, the mass content of Pt remained to be 3.7 wt %, which was almost unchanged, and the mass content of the FeO$_x$ promoter was 0.15 wt % in terms of iron element.

Figure 7:
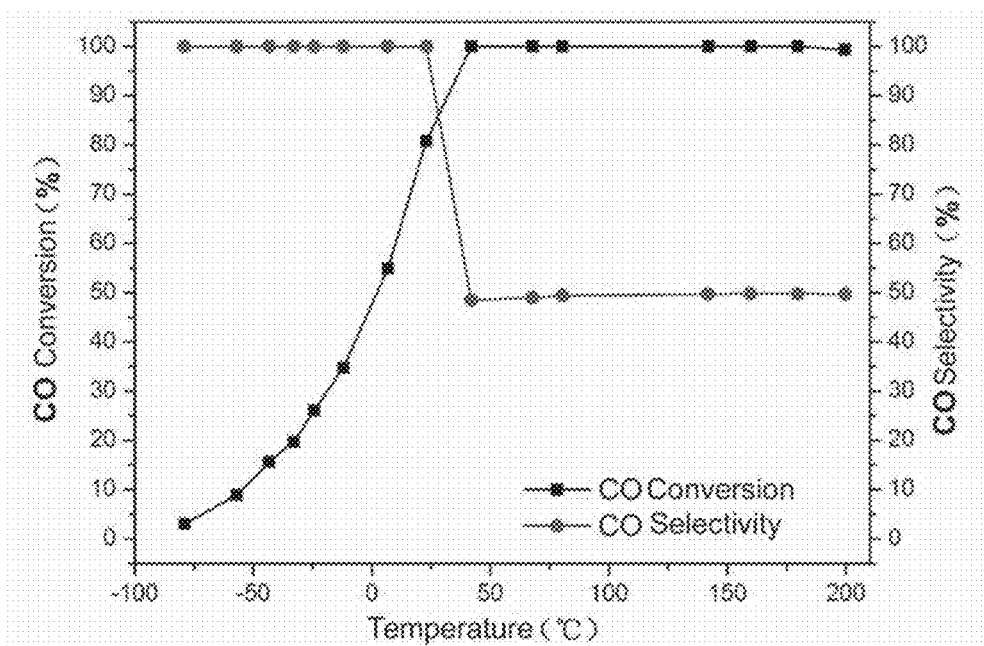
FIG. 7 shows a plot of CO conversion and CO selectivity in preferential oxidation of CO in a hydrogen-enriched atmosphere over a Pt-1cFeO$_x$/Al$_2$O$_3$ wide-temperature catalyst prepared according to Example 11 of this invention, wherein the volume ratio of CO:O$_2$:H$_2$ is 1:1:48 for the hydrogen-enriched reaction gas sample used therein.

Activity test for preferential oxidation reaction of CO in hydrogen-enriched atmosphere: The volume ratio of CO:O$_2$:H$_2$ in the reaction gas was 1:1:48. Catalyst: 100 mg of the Pt-1cFeO$_x$/Al$_2$O$_3$ catalyst described above and 1 g of quartz sand were firstly ground and uniformly mixed. Reactor: a U-shape quartz tube. Catalyst pretreatment: the treatment was performed in a 10% O$_2$/He atmosphere at 200° C. for 1 hour, then reduced in 10% H$_2$/He for another 2 hours and finally activated in the reaction stream of 1% CO+0.5% O$_2$+48% H$_2$+50.5% He for 20 minutes. Composition of the reaction gas: 1% CO+0.5% O$_2$+48% H$_2$+50.5% He, and the flow rate of the reaction gas was 60 mL/min. The catalyst was subjected to an activity test in a temperature range of −80 to 200° C., and the test results were shown in FIG. 7. Complete conversion of CO was achieved in a temperature range of 50 to 200° C. by using the wide-temperature catalyst prepared in this invention.

Example 12: Preparation of Pt-1cCoO$_x$/SiO$_2$ Catalyst and Activity Test for Preferential Oxidation Reaction of CO in Hydrogen-Enriched Atmosphere Preparation of Pt/SiO$_2$ catalyst precursor: Firstly, tetraethyl orthosilicate was used as a raw material to synthesize monodispersed silicon dioxide spheres (SiO$_2$) by basic hydrolysis. Then, the synthesized silicon dioxide spheres were calcined at 300° C. Thereafter, 3-aminopropyl-triethoxy silane (ATPES) was used to modify the surface of the silicon dioxide spheres (ATPES-SiO$_2$). 1.4 g of ATPES-SiO$_2$ and 7.9 mL of chloroplatinic acid were added to 30 mL of ethanol, stirred at room temperature for 24 hours, and centrifuged followed by drying to obtain Pt/SiO$_2$. Here, the mass content of Pt in the catalyst was 3.2 wt %, and the particle size of Pt was less than 1.5 nm.

Deposition of CoO$_x$ promoter: The temperature of the reaction chamber of atomic layer deposition (a viscous flow reactor, Arradiance) was heated to 120° C. by ohmic heating. The metal precursor of a CoO$_x$ promoter used was cobaltocene (CoCp$_2$, Sigma Aldrich), which was put in a container heated to 90° C. by using a heating jacket to obtain a sufficient vapor pressure of cobaltocene. 200 mg of the Pt/SiO$_2$ catalyst precursor described above was placed in the reaction chamber. The shut valve between the cobaltocene source container and the atomic layer deposition reaction chamber was opened, and the vapor of cobaltocene was introduced to the reaction chamber carried using high-purity N$_2$ (99.999%, Nanjing Specialty Gas) as a carrier gas. Cobaltocene was adsorbed on the surface of chloroplatinate ions in the Pt/SiO$_2$ catalyst precursor to initiate the nucleation of Co on the Pt ions, and the time of introduction for cobaltocene precursor was 3 minutes. After the shut valve was closed, high-purity O$_2$ (99.999%, Nanjing Specialty Gas) as an oxidizing agent was introduced to the reaction chamber for 3 minutes to burn off the organic ligand of cobaltocene adsorbed on the surface of Pt through oxidation. As a result, cobaltocene was converted to CoO$_x$, yielding the deposition of CoO$_x$ on the surface of the catalyst. Finally, the sample was taken out from the reaction chamber to obtain a Pt-1cCoO$_x$/SiO$_2$ catalyst. In the catalyst obtained, the mass content of Pt was 3.2 wt %, which was maintained almost unchanged, and the mass content of the $CoO_x$ promoter was 0.9 wt % in terms of Co element.

Figure 8:
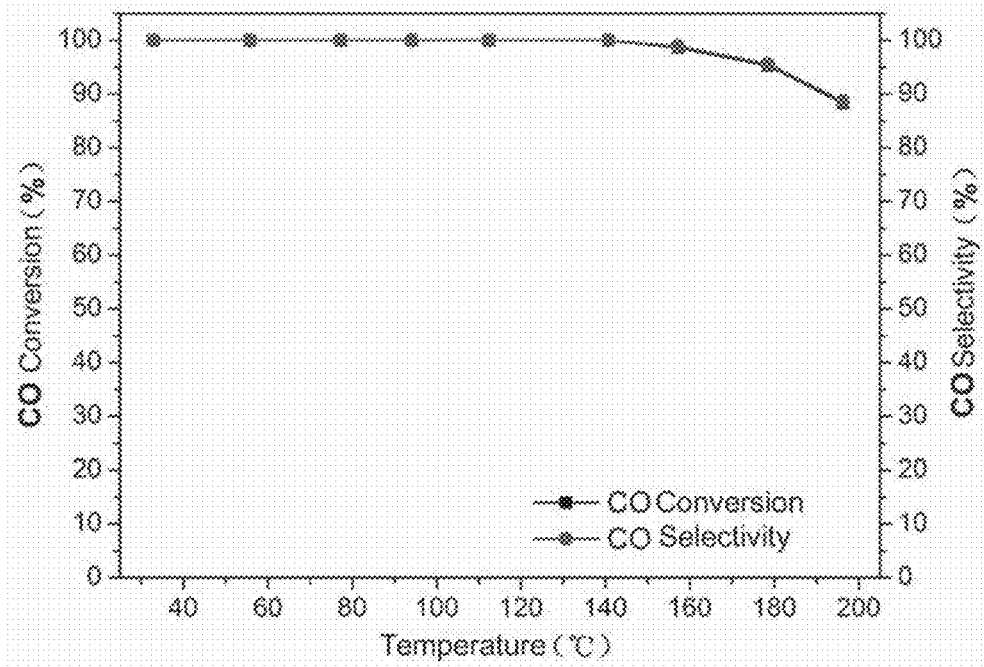
FIG. 8 shows a plot of CO conversion and CO selectivity in preferential oxidation of CO in a hydrogen-enriched atmosphere over a Pt-1cCoO$_x$/SiO$_2$ wide-temperature catalyst prepared according to Example 12 of this invention, wherein the volume ratio of CO:O$_2$:H$_2$ is 1:0.5:48 for the hydrogen-enriched reaction gas sample used therein.

Activity test for preferential oxidation of CO in hydrogen-enriched atmosphere: The volume ratio of $CO:O_2:H_2$ in the reaction gas was 1:0.5:48. Catalyst: 100 mg of the Pt-1c$CoO_x$/$SiO_2$ catalyst described above and 1 g of quartz sand were firstly ground and uniformly mixed. Reactor: a U-shape quartz tube. Catalyst pretreatment: the treatment was performed in a 10% $O_2$/He atmosphere at 250° C. for 2 hours, then reduced in 10% $H_2$/He for another 2 hours and finally activated in the reaction stream of 1% CO+0.5% $O_2$+48% $H_2$+50.5% He for 20 minutes. Composition of the reaction gas: 1% CO+0.5% $O_2$+48% $H_2$+50.5% He, and the flow rate of the reaction gas was 60 mL/min. The catalyst was subjected to an activity test in a temperature range of 30 to 200° C., and the test results were shown in FIG. 8. Complete conversion of CO was achieved in a temperature range of 30 to 140° C. by using the wide-temperature catalyst prepared in this invention.

Examples 13-18: Preparation of Pt-1c$CoO_x$/$SiO_2$ Catalyst and Activity Test Preferential Oxidation Reaction of CO in Hydrogen-Enriched Atmosphere The same procedures as those of Example 12 were performed, except that cobalt acetylacetonate, bis(N,N'-diisopropylacetamidinyl) cobalt, dicarbonylcyclopentadienyl cobalt, t-butyltricarbonyl cobalt, (2,2,6,6-tetramethyl-3,5-pentanedionato) cobalt, and cobalt 2-methoxyethoxide (all purchased from Sigma Aldrich) were used as metal precursors of the $CoO_x$ promoter respectively, instead of cobaltocene ($CoCp_2$, Sigma Aldrich), and the cycle number of deposition was one so as to obtain six corresponding Pt-1c$CoO_x$/$SiO_2$ catalyst samples, respectively. In these six samples obtained, the mass content of Pt were 3.2 wt %, and the mass content of the $CoO_x$ promoter were 0.8 wt %, 0.7 wt %, 0.7 wt %, 0.8 wt %, 0.8 wt %, and 0.9 wt % in terms of cobalt element, respectively.

Each of the catalysts obtained above exhibited the achievement of high conversion of CO in a hydrogen-enriched atmosphere in a wide temperature range similar to that in Example 12 under the same procedures and conditions as those in Example 12, in an activity test for preferential oxidation reaction of CO in a hydrogen-enriched atmosphere.

Example 19: Preparation of Pt-1c$NiO_x$/$SiO_2$ Catalyst and Test for Preferential Oxidation of CO in Hydrogen-Enriched Atmosphere Preparation of Pt/$SiO_2$ catalyst precursor: The Pt/$SiO_2$ catalyst precursor was synthesized using atomic layer deposition in a viscous flow atomic layer deposition reactor (Arradiance). The Pt deposition temperature was 250° C. The Pt precursor was (trimethyl)methylcyclopentadienyl platinum (IV) ($MeCpPtMe_3$, Strem Chemicals), which was put in a container heated to 70° C. with a heating jacket to obtain a sufficient vapor pressure of $MeCpPtMe_3$. The oxidizing agent was high-purity $O_2$ (99.999%, Nanjing Specialty Gas), and the inert gas was high-purity $N_2$ (99.999%, Nanjing Specialty Gas). During the catalyst precursor synthesis, 700 mg of a $SiO_2$ carrier (300 $m^2$/g, Alfa Aesar) was placed in the reaction chamber, and (a) the vapor of $MeCpPtMe_3$ was introduced to the reaction chamber by using high-purity $N_2$ as a carrier gas for 10 minutes; (b) after the source of $MeCpPtMe_3$ was closed, a high-purity $N_2$ gas was used to purge the chamber for 5 minutes; (c) next, high-purity $O_2$ was introduced to the reaction chamber for 3 minutes; and (d) the source of $O_2$ was then closed, and a high-purity $N_2$ gas was used for to purge the chamber for 5 minutes. The above steps (a-d) were repeated twice, i.e., 2 cycles of atomic layer deposition were performed. After Pt deposition, the sample was taken out from the reaction chamber to obtain a Pt/$SiO_2$ catalyst precursor. Here, the mass content of Pt was 3.6 wt %, and the particle size of Pt was 2.7±0.4 nm according to the results of high-resolution transmission electron microscope.

Deposition of $NiO_x$ promoter: The temperature of the reaction chamber of atomic layer deposition (a viscous flow reactor, Arradiance) was heated to 120° C. by ohmic heating. The metal precursor of the $NiO_x$ promoter was nickelocene ($NiCp_2$, Sigma Aldrich), which was loaded into a container heated to 90° C. by using a heating jacket to obtain a sufficient vapor pressure of nickelocene. 150 mg of the Pt/$SiO_2$ catalyst precursor described above was placed in the reaction chamber. The shut valve between the nickelocene container and the reaction chamber was opened, and the vapor of nickelocene was introduced to the reaction chamber using high-purity $N_2$ (99.999%, Nanjing Specialty Gas) as a carrier gas. Nickelocene was adsorbed on the surface of Pt nanoparticles in the Pt/$SiO_2$ catalyst precursor to initiate the deposition of Ni on Pt particles. The time of introduction was 2.5 minutes. After the shut valve was closed, high-purity $O_2$ (99.999%, Nanjing Specialty Gas) as an oxidizing agent was introduced to the reaction chamber for 2 minutes to combust away the organic ligands of nickelocene adsorbed on the surface of Pt through oxidation. As a result, nickelocene was converted to $NiO_x$, yielding the deposition of NiOx on the surface of the catalyst. Finally, the sample was taken out from the reaction chamber to obtain a Pt-1c$NiO_x$/$SiO_2$ catalyst. In the catalyst obtained, the mass content of Pt was 3.6 wt %, which was maintained almost unchanged, and the mass content of the $NiO_x$ promoter was 1.23 wt % in terms of Ni element.

Figure 9:
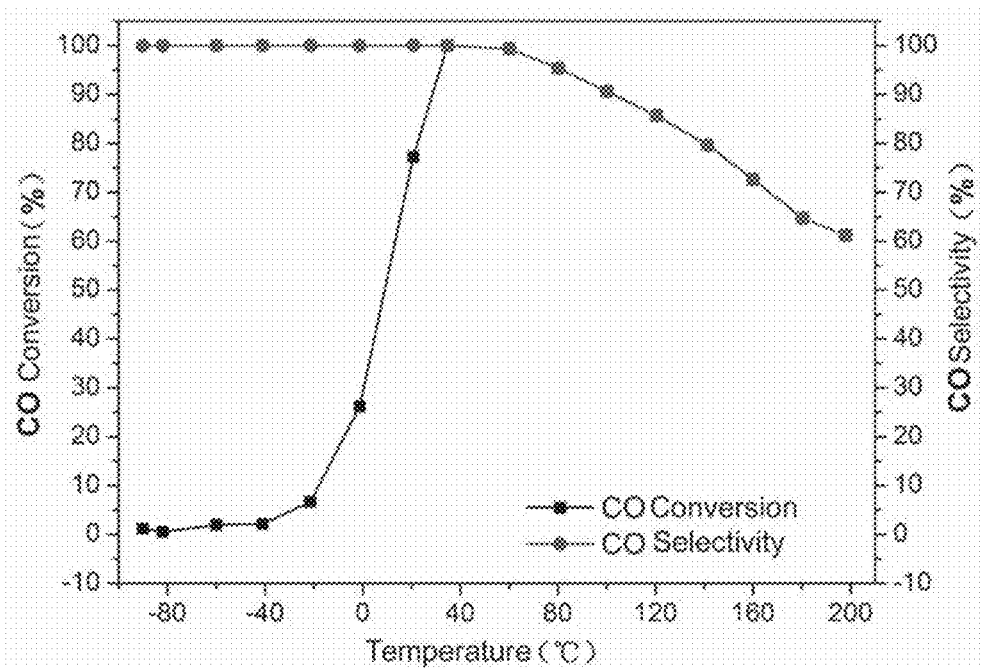
FIG. 9 shows a plot of CO conversion and CO selectivity in preferential oxidation of CO in a hydrogen-enriched atmosphere over a Pt-1cNiO$_x$/SiO$_2$ wide-temperature catalyst prepared according to Example 19 of this invention, wherein the volume ratio of CO:O$_2$:H$_2$ is 1:0.5:48 for the hydrogen-enriched reaction gas sample used therein.

Activity test for preferential oxidation reaction of CO in hydrogen-enriched atmosphere: The volume ratio of $CO:O_2:H_2$ in the reaction gas was 1:0.5:48. Catalyst: 100 mg of the Pt-1c$NiO_x$/$SiO_2$ catalyst described above and 1 g of quartz sand were firstly ground and uniformly mixed. Reactor: a U-shape quartz tube. Catalyst pretreatment: the treatment was performed in a 10% $O_2$/He atmosphere at 200° C. for 2 hours, then reduced in 10% $H_2$/He for another 1 hour. Composition of the reaction gas: 1% CO+0.5% $O_2$+48% $H_2$+50.5% He, and the flow rate of the reaction gas was 60 mL/min. The catalyst was subjected to an activity test in a temperature range of −80 to 200° C., and the test results were shown in FIG. 9. Complete conversion of CO was achieved in a temperature range of 35 to 60° C. by using the wide-temperature catalyst prepared in this invention.

Examples 20-24: Preparation of Pt-1c$NiO_x$/$SiO_2$ Catalyst and Activity Test for Preferential Oxidation Reaction of CO in Hydrogen-Enriched Atmosphere The same procedures as those of Example 19 were performed, except that nickel acetylacetonate, bis(N,N'-diisopropylacetamidinyl) nickel, (2,2,6,6-tetramethyl-3,5-pentanedionato) nickel(II), dibutyldithiocarbamate nickel (II), and nickel 2-methoxyethoxide (all purchased from Sigma Aldrich) were used as metal precursor of the $NiO_x$ promoter, respectively, instead of nickelocene ($NiCp_2$, Sigma Aldrich). The cycle number of deposition was one so as to obtain five corresponding Pt-1c$NiO_x$/$SiO_2$ samples. In these five samples obtained, the mass content of Pt element were 3.6 wt %, and the mass content of the $NiO_x$ promoter were 1.0 wt %, 0.8 wt %, 0.7 wt %, 0.7 wt %, and 0.7 wt % in terms of nickel element, respectively.

Each of the catalysts obtained above exhibited the achievement of high conversion of CO in a hydrogen-enriched atmosphere in a wide temperature range similar to that in Example 19 under the same procedures and conditions as those in Example 19, in an activity test for preferential oxidation reaction of CO in a hydrogen-enriched atmosphere.

Example 25: Preparation of Ir-2cFeO$_x$/SiO$_2$ Catalyst and Activity for Preferential Oxidation Reaction of CO in Hydrogen-Enriched Atmosphere Preparation of Ir/SiO$_2$ catalyst precursor: The Ir/SiO$_2$ catalyst precursor was synthesized by an impregnation method. 480 mg of SiO$_2$ was added to an aqueous solution containing 2.12 mL of chloroiridic acid ($2.46 \times 10^{-3}$ M), and stirred for 24 hours. The aqueous solution was evaporated at a temperature of 80° C., then placing and drying in an oven at 70° C., to obtain an Ir/SiO$_2$ catalyst. In the catalyst, the mass content of Ir was 3.7 wt %, and the particle size of Ir was 1.50±0.6 nm.

Deposition of FeO$_x$ promoter: The temperature of the reaction chamber of atomic layer deposition (a viscous flow reactor, Arradiance) was heated to 200° C. by ohmic heating. The metal precursor of FeO$_x$ promoter was ferrocene (FeCp$_2$, Sigma Aldrich). The temperature of a ferrocene container was heated to 90° C. by using a heating jacket to obtain a sufficient vapor pressure of ferrocene. 200 mg of the Ir/SiO$_2$ sample was placed in the reaction chamber. (a) The shut valve between a ferrocene container and the reaction chamber was opened, and the vapor of ferrocene was introduced to the reaction chamber using high-purity N$_2$ (99.999%, Nanjing Specialty Gas) as a carrier gas. Ferrocene adsorbs on the surface of Ir particles in the Ir/SiO$_2$ catalyst precursor, thus achieving the nucleation of Fe on the surface of Ir. The time for ferrocene introduction was 2.5 minutes. (b) After the shut valve was closed, high-purity N$_2$ (99.999%, Nanjing Specialty Gas) was used to purge the reaction chamber for 5 minutes. (c) High-purity O$_2$ (99.999%, Nanjing Specialty Gas) as an oxidizing agent was introduced to the reaction chamber for 2.5 minutes, as an oxidizing agent was introduced to the reaction chamber for 5 minutes to combust away the organic ligand of ferrocene adsorbed on the surface of Ir through oxidation. As a result, FeO$_x$ was formed on the Ir surface. (d) Purging the chamber with high-purity N$_2$ gas for 5 minutes. The above steps (a-d) were repeated 2 times, i.e., 2 cycles of atomic layer deposition were performed. The sample was taken out from the reaction chamber to obtain the Ir-2cFeO$_x$/SiO$_2$ catalyst. In this catalyst obtained, the mass content of Ir remained to be 3.7 wt %, which was almost unchanged, and the mass content of the FeO$_x$ promoter was 0.12 wt % in terms of iron element.

Figure 10:
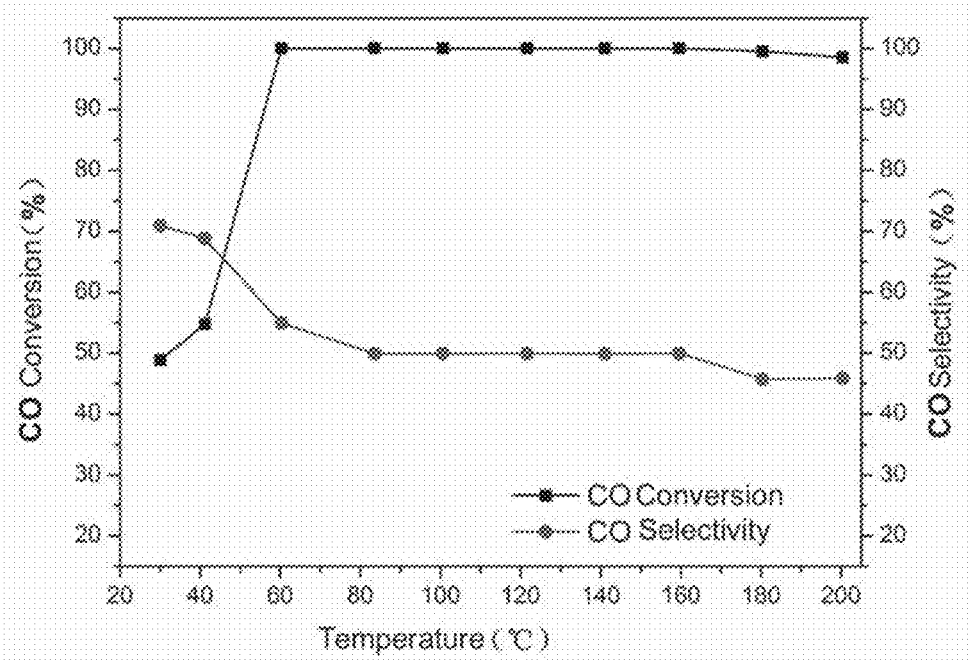
FIG. 10 shows a plot of CO conversion and CO selectivity in preferential oxidation of CO in a hydrogen-enriched atmosphere over a Ir-2cFeO$_x$/SiO$_2$ wide-temperature catalyst prepared according to Example 25 of this invention, wherein the volume ratio of CO:O$_2$:H$_2$ is 1:1:48 for the hydrogen-enriched reaction gas sample used therein.

Activity test for preferential oxidation reaction of CO in hydrogen-enriched atmosphere: The volume ratio of CO:O$_2$:H$_2$ in the reaction gas was 1:1:48. Catalyst: 100 mg of the Ir-2cFeO$_x$/SiO$_2$ catalyst described above and 1 g of quartz sand were firstly ground and uniformly mixed. Reactor: a U-shape quartz tube. Catalyst pretreatment: the treatment was performed in a 10% O$_2$/Ar atmosphere at 200° C. for 1 hour, then reduced in 10% H$_2$/He for another 2 hours. Composition of the reaction gas: 1% CO+1% O$_2$+48% H$_2$+50% Ar, and the flow rate of the reaction gas was 60 mL/min. The catalyst was subjected to an activity test in a temperature range of room temperature to 200° C., and the test results were shown in FIG. 10. Complete conversion of CO was achieved in a temperature range of 60 to 180° C. by using the wide-temperature catalyst prepared in this invention.

Figure 11:
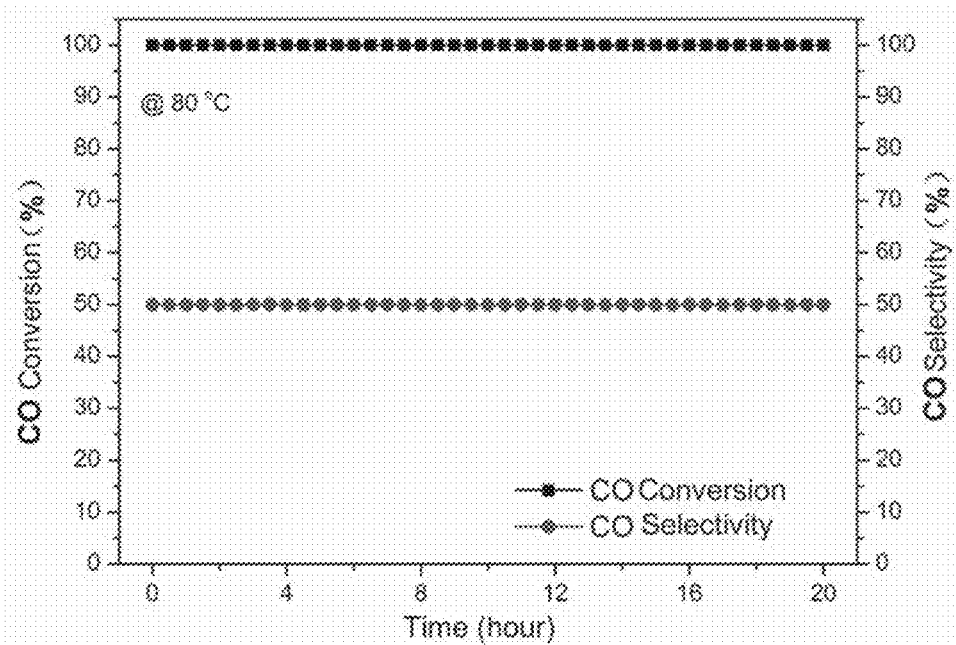
FIG. 11 shows a plot of stability of an Ir-2cFeO$_x$/SiO$_2$ wide-temperature catalyst prepared according to Example 25 of this invention at a temperature of 80° C.

Stability test: The stability of the Ir-2cFeO$_x$/SiO$_2$ catalyst described above in preferential oxidation reaction of CO in a hydrogen-enriched atmosphere was also performed. The volume ratio of CO:O$_2$:H$_2$ in the reaction gas was 1:1:48. The usage amount of the catalyst, the pretreatment, and the reaction conditions were described above. The reaction temperature was fixed at 80° C., and the sample was continuously tested for 20 hours. As shown in FIG. 11, this catalyst remained stable at 80° C. for 20 hours without any visible deactivation.

Example 26: Preparation of Ir-1cCoO$_x$/SiO$_2$ Catalyst and Activity Test for Preferential Oxidation Reaction of CO in Hydrogen-Enriched Atmosphere Preparation of Ir/SiO$_2$ catalyst precursor: Firstly, tetraethyl orthosilicate was used as a raw material to synthesize monodispersed silicon dioxide spheres (SiO$_2$) by basic hydrolysis. Then, the synthesized silicon dioxide spheres were calcined at 300° C. Thereafter, 3-aminopropyl-triethoxy silane (ATPES) was used to modify the surface of the silicon dioxide spheres (ATPES-SiO$_2$). 480 mg of ATPES-SiO$_2$ and 2.12 mL of chloroiridic acid were added to 50 mL of an aqueous solution, and stirred at room temperature for 24 hours. The aqueous solution was evaporated at a temperature of 80° C., followed by drying, to obtain Ir/SiO$_2$.

Deposition of CoO$_x$ promoter: The temperature of the reaction chamber of atomic layer deposition (a viscous flow reactor, Arradiance) was heated to 150° C. by ohmic heating. The metal precursor of a CoO$_x$ promoter used was cobaltocene (CoCp$_2$, Sigma Aldrich), which was put in a container heated to 90° C. by using a heating jacket to obtain a sufficient vapor pressure of cobaltocene. 200 mg of the Ir/SiO$_2$ catalyst precursor described above was placed in the reaction chamber. The shut valve between the cobaltocene source container and the atomic layer deposition reaction chamber was opened, and the vapor of cobaltocene was introduced to the reaction chamber carried using high-purity N$_2$ (99.999%, Nanjing Specialty Gas) as a carrier gas. Cobaltocene adsorbs on the surface of chloroplatinate ions in the Ir/SiO$_2$ catalyst precursor to initiate the nucleation of Co on the Ir ions, and the time of introduction for cobaltocene precursor was 3 minutes. After the shut valve was closed, high-purity O$_2$ (99.999%, Nanjing Specialty Gas) as an oxidizing agent was introduced to the reaction chamber for 3 minutes to burn off the organic ligand of cobaltocene adsorbed on the surface of Ir through oxidation. As a result, cobaltocene was converted to CoO$_x$, yielding the deposition of CoO$_x$ on the surface of the catalyst. Finally, the sample was taken out from the reaction chamber to obtain a Ir-1cCoO$_x$/SiO$_2$ catalyst. In the catalyst obtained, the mass content of the CoO$_x$ promoter was 1.23 wt % in terms of Co element.

Activity test for preferential oxidation reaction of CO in hydrogen-enriched atmosphere: The volume ratio of CO:O$_2$:H$_2$ in the reaction gas was 1:1:48. Catalyst: 100 mg of the Ir-1cCoO$_x$/SiO$_2$ catalyst described above and 1 g of quartz sand were firstly ground and uniformly mixed. Reactor: a U-shape quartz tube. Catalyst pretreatment: the treatment was performed in a 10% O$_2$/Ar atmosphere at 500° C. for 1 hour, reduced at 250° C. for another 1 hour in 10% H$_2$/He.

Figure 12:
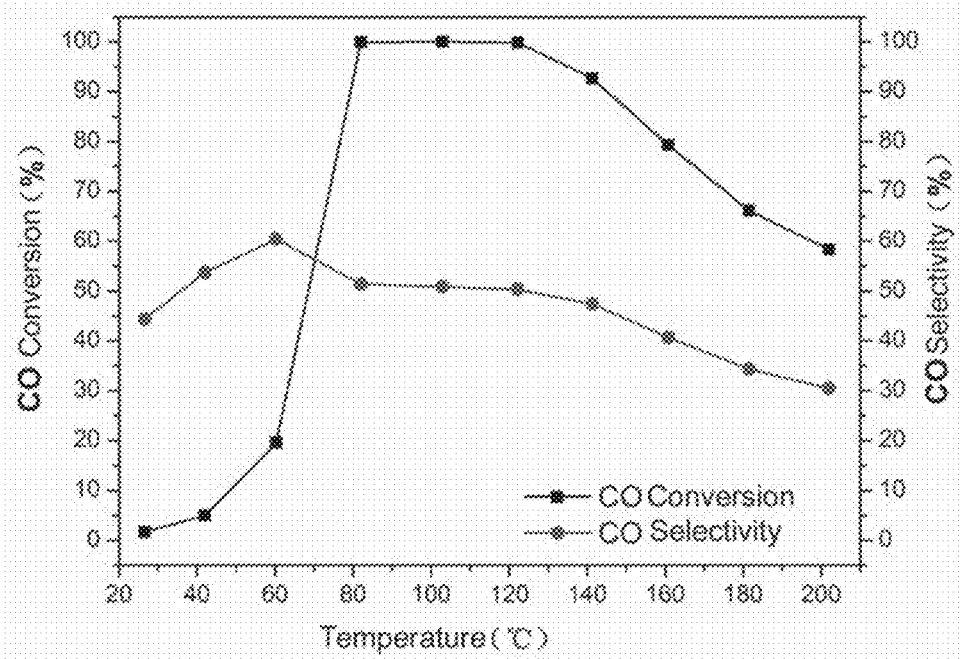
FIG. 12 shows a plot of CO conversion and CO selectivity in preferential oxidation of CO in a hydrogen-enriched atmosphere over a Ir-1cCoO$_x$/SiO$_2$ wide-temperature catalyst prepared according to Example 26 of this invention, wherein the volume ratio of CO:O$_2$:H$_2$ is 1:1:48 for the hydrogen-enriched reaction gas sample used therein.

Composition of the reaction gas: 1% CO+1% $O_2$+48% $H_2$+50% Ar, and the flow rate of the reaction gas was 30 mL/min. The catalyst was subjected to an activity test in a temperature range of 20 to 200° C., and the test results were shown in FIG. 12. Complete conversion of CO was achieved in a temperature range of 80 to 120° C. by using the wide-temperature catalyst prepared in this invention.

Example 27: Preparation of Pt-1cFeO$_x$/SiO$_2$ (Fe(acac)$_3$) Catalyst and Activity Test for Preferential Oxidation Reaction of CO in Hydrogen-Enriched Atmosphere Preparation of Pt/SiO$_2$ catalyst precursor: The Pt/SiO$_2$ catalyst precursor was synthesized using atomic layer deposition in a viscous flow atomic layer deposition reactor (Arradiance). The Pt deposition temperature was 250° C. The Pt precursor was (trimethyl)methylcyclopentadienyl platinum (IV) (MeCpPtMe$_3$, Strem Chemicals), which was put in a container heated to 70° C. with a heating jacket to obtain a sufficient vapor pressure of MeCpPtMe$_3$. The oxidizing agent was high-purity $O_2$ (99.999%, Nanjing Specialty Gas), and the inert gas was high-purity $N_2$ (99.999%, Nanjing Specialty Gas). During the catalyst precursor synthesis, 700 mg of a SiO$_2$ carrier (300 m$^2$/g, Alfa Aesar) was placed in the reaction chamber, and (a) the vapor of MeCpPtMe$_3$ was introduced to the reaction chamber by using high-purity $N_2$ as a carrier gas for 10 minutes; (b) after the source of MeCpPtMe$_3$ was closed, a high-purity $N_2$ gas was used to purge the chamber for 5 minutes; (c) next, high-purity $O_2$ was introduced to the reaction chamber for 3 minutes; and (d) the source of $O_2$ was then closed, and a high-purity $N_2$ gas was used for to purge the chamber for 5 minutes. The above steps (a-d) were repeated twice, i.e., 2 cycles of atomic layer deposition were performed. After Pt deposition, the sample was taken out from the reaction chamber to obtain a Pt/SiO$_2$ catalyst precursor. Here, the mass content of Pt was 3.6 wt %, and the particle size of Pt was 2.7±0.4 nm according to the results of high-resolution transmission electron microscope.

Deposition of FeO$_x$ promoter: The temperature of the reaction chamber of atomic layer deposition (a viscous flow reactor, Arradiance) was heated to 120° C. by ohmic heating. The metal precursor of the FeO$_x$ promoter was iron acetylacetonate (Fe(acac)$_3$, Sigma Aldrich), which was loaded into a container heated to 90° C. by using a heating jacket to obtain a sufficient vapor pressure of iron acetylacetonate. 200 mg of the Pt/SiO$_2$ catalyst precursor described above was placed in the reaction chamber. The shut valve between the iron acetylacetonate container and the chamber was opened, and the vapor of iron acetylacetonate was introduced to the reaction chamber with high-purity $N_2$ (99.999%, Nanjing Specialty Gas) as a carrier gas. Iron acetylacetonate adsorbs on the surface of Pt particles in the Pt/SiO$_2$ catalyst precursor to initiate the nucleation of Fe on the surface of Pt. The time of introduction of iron acetylacetonate was 2.5 minutes. After the shut valve was closed, high-purity $O_2$ (99.999%, Nanjing Specialty Gas) as an oxidizing agent was introduced to the reaction chamber for 3 minutes to combust away the organic ligands of iron acetylacetonate adsorbed on the surface of Pt through oxidation. As a result, iron acetylacetonate was converted to FeO$_x$, yielding the deposition of FeO$_x$ on the surface of the catalyst. Finally, the sample was taken out from the reaction chamber to obtain a Pt-1cFeO$_x$/SiO$_2$ (Fe(acac)$_3$) catalyst. In the catalyst obtained, the mass content of Pt was 3.6 wt %, which was maintained almost unchanged, and the mass content of Fe element of the FeO$_x$ promoter was 0.9%.

Figure 13:
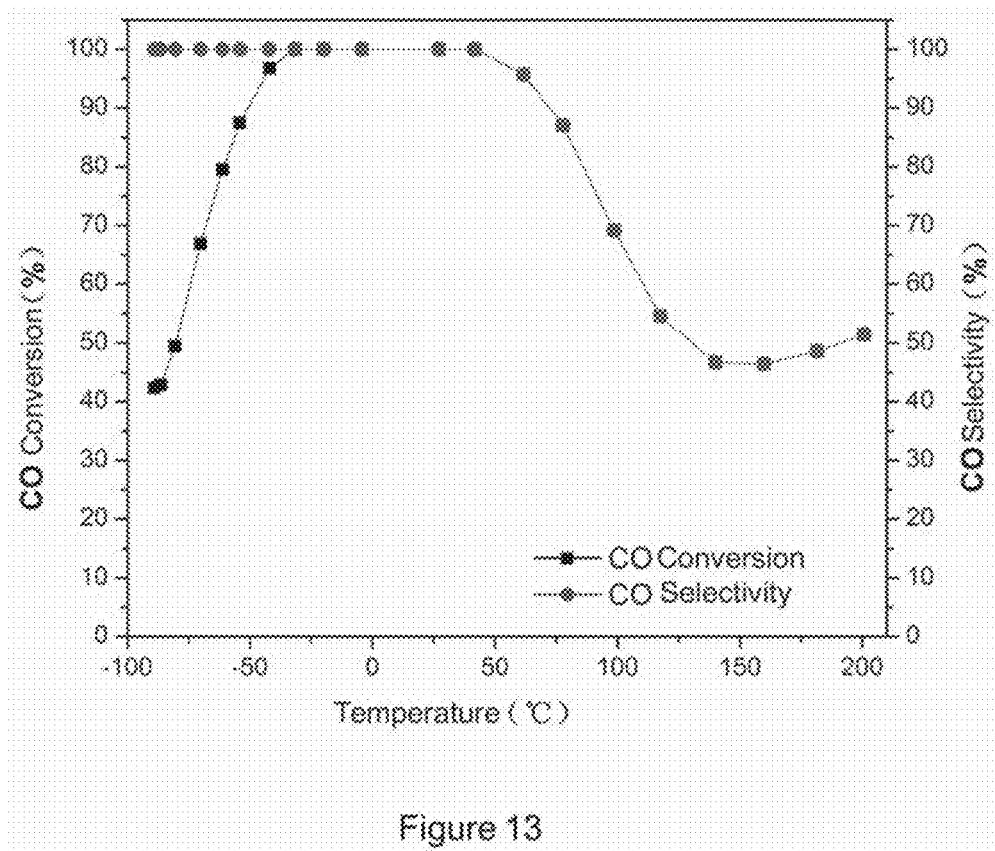
FIG. 13 shows a plot of CO conversion rate and CO selectivity in preferential oxidation of CO in a hydrogen-enriched atmosphere over a Pt-1cFeO$_x$/SiO$_2$ (Fe(acac)$_3$) wide-temperature catalyst prepared according to Example 27 of this invention, wherein the volume ratio of CO:O$_2$:H$_2$ is 1:0.5:48 for the hydrogen-enriched reaction gas sample used therein.

Activity test for preferential oxidation reaction of CO in hydrogen-enriched atmosphere: The volume ratio of CO:$O_2$:$H_2$ in the reaction gas was 1:0.5:48. Catalyst: 100 mg of the Pt-1cFeO$_x$/SiO$_2$ (Fe(acac)$_3$) catalyst described above and 1 g of quartz sand were firstly ground and uniformly mixed. Reactor: a U-shape quartz tube. Catalyst pretreatment: the treatment was performed in a 10% $O_2$/He atmosphere at 200° C. for 1 hour, then reduced for another 2 hours in 10% $H_2$/He, and finally further activated in the reaction stream of 1% CO+0.5% $O_2$+48% $H_2$+50.5% He for 20 minutes. Composition of the reaction gas: 1% CO+0.5% $O_2$+48% $H_2$+50.5% He, and the flow rate of the reaction gas was 60 mL/min. The catalyst was subjected to an activity test in a temperature range of −80 to 200° C., and the test results were shown in FIG. 13. Complete conversion of CO was achieved in a temperature range of −30 to 42° C. by using the wide-temperature catalyst prepared in this invention.

Although specific embodiments of this invention have been described in detail, the person skilled in the art will understand that various modifications and substitutions may be made to those details according to all knowledges which have been already disclosed. All of these changes are within the scope protected by this invention. Then entire scope of this invention is presented by appended claims and equivalents thereof.

What is claimed is:

1. A method of preparing a wide-temperature catalyst for preferential oxidization of CO in a hydrogen-enriched atmosphere, the catalyst including:
 a carrier, an active component, and a promoter, wherein the carrier is SiO$_2$; the active component is Pt with a content of 0.1 to 10 wt % in the wide-temperature catalyst; and the promoter is iron oxide with a content of 0.01 to 0.3 wt % in the wide-temperature catalyst, in terms of the iron element thereof;
 the method comprising:
 impregnating a soluble salt of the active component onto the carrier or depositing the active component onto the carrier by atomic layer deposition to obtain a supported catalyst precursor; and
 depositing the promoter onto the surface of the supported catalyst precursor by atomic layer deposition to obtain the wide-temperature catalyst,
 in which depositing the promoter onto the surface of the supported catalyst precursor is conducted by:
 step (a) placing the supported catalyst precursor in a reactor at a temperature of 90 to 500° C.;
 step (b) using an inert gas as a carrier gas to adsorb the vapor of a promoter precursor onto the surface of the supported catalyst precursor, wherein the promoter precursor is an iron precursor;
 step (c) converting the promoter precursor to the promoter by an oxidizing agent; and
 step (d) optionally, repeating steps (a)-(c) one or more times sequentially or simultaneously to regulate the mass content of the promoter.

2. The method according to claim 1, wherein the iron precursor is one or more selected from ferrocene, vinyl ferrocene, ethyl ferrocene, amino ferrocene, dimethylamino ferrocene, iron acetylacetonate, bis(2,4-dimethylpentadienyl) iron, (2,2,6,6-tetramethyl-3,5-pentanedionato) iron (III), bis(N,N'-di-t-butylacetamidinyl) iron, iron carbonyl, and iron t-butoxide.

3. The method according to claim 1, wherein the oxidizing agent is one or more selected from $O_2$, $O_3$, $H_2O$, $H_2O_2$, NO, and $NO_2$; and the reducing agent is one or more selected from $H_2$, $NH_3$, and $N_2H_4$.

4. The method according to claim 1, wherein the method further comprises the step of: purging the reactor with an inert gas between the step (b) and the step (c) as well as after the step (c).

5. The method according to claim 1, wherein the steps (b) and (c) are sequentially repeated 1 to 10 times.

6. The method according to claim 1, wherein the supported catalyst precursor is obtained by impregnating a desired amount of a soluble salt of an active component onto a carrier and then drying and baking via a impregnation method.

7. Use of the wide-temperature catalyst prepared by the method according to claim 1, wherein the catalyst is for preferential oxidization of CO in a hydrogen-enriched atmosphere.

8. The use according to claim 7, wherein the wide-temperature catalyst is subjected to a pretreatment before use, and the pretreatment is oxidization with oxygen at a temperature of 100 to 600° C. for 0.5 to 5 hours and then reduction with hydrogen for 0.5 to 5 hours.

9. The use according to claim 7, wherein the wide-temperature catalyst is subjected to a pretreatment before use, and the pretreatment is first oxidization with oxygen at a temperature of 150 to 300° C. for 0.5 to 2 hours and then reduction with hydrogen for 0.5 to 2 hours.

10. The use according to claim 7, wherein a volume ratio of CO to $O_2$ in the hydrogen-enriched atmosphere is 1:0.5 to 1:2.

11. The use according to claim 7, wherein a volume ratio of CO to $O_2$ in the hydrogen-enriched atmosphere is 1:0.5 to 1:1.

* * * * *